US011778522B2

(12) United States Patent
Bartolome Rodrigo et al.

(10) Patent No.: US 11,778,522 B2
(45) Date of Patent: Oct. 3, 2023

(54) METHODS AND APPARATUSES FOR TRANSFERRING RESTORATION CONTEXT DATA

(71) Applicant: Telefonaktiebolaget LM Ericsson (publ), Stockholm (SE)

(72) Inventors: Maria Cruz Bartolome Rodrigo, Madrid (ES); Attila Mihály, Dunakeszi (HU)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 205 days.

(21) Appl. No.: 17/431,592

(22) PCT Filed: Feb. 4, 2020

(86) PCT No.: PCT/EP2020/052744
§ 371 (c)(1),
(2) Date: Aug. 17, 2021

(87) PCT Pub. No.: WO2020/169337
PCT Pub. Date: Aug. 27, 2020

(65) Prior Publication Data
US 2022/0141721 A1    May 5, 2022

(30) Foreign Application Priority Data
Feb. 18, 2019  (EP) .................... 19382111

(51) Int. Cl.
*H04W 76/19* (2018.01)
*H04W 36/00* (2009.01)
(Continued)

(52) U.S. Cl.
CPC ....... *H04W 36/0033* (2013.01); *H04W 48/18* (2013.01); *H04W 60/06* (2013.01); *H04W 76/19* (2018.02)

(58) Field of Classification Search
CPC . H04W 8/00; H04W 36/003; H04W 36/0038; H04W 36/0044; H04W 48/18;
(Continued)

(56) References Cited

U.S. PATENT DOCUMENTS 10,999,787 B2 * 5/2021 Dao .................... H04W 48/18
2018/0139106 A1 * 5/2018 Senarath ................ H04L 67/51
(Continued)

FOREIGN PATENT DOCUMENTS

WO    2018128529 A1    7/2018

OTHER PUBLICATIONS

Indian Examination Report dated Mar. 30, 2022 for Application No. 202117029969, consisting of 5 pages.
(Continued)

*Primary Examiner* — Jean A Gelin
(74) *Attorney, Agent, or Firm* — Christopher & Weisberg, P.A.

(57) ABSTRACT

Transferring context data from a first network functional set, NFS, to another. A method and apparatuses provide for transferring restoration context data from a first NFS toward a second NFS. This method includes receiving, at the first NFS from a context transfer requester, a transfer request indicating transfer of context data toward the second NFS; transmitting, from the first NFS toward a network repository function, NRF, a context transfer request indicating transfer of context data from the first NFS to the second NFS; transmitting, from the NRF toward the first NFS, a context transfer response indicating a status of the first NFS; notifying, from the NRF toward a network function, NF, service consumer, of transfer information related to the transfer of context data from the first NFS to the second NFS; transferring, from the first NFS toward the second NFS, restoration context data; and storing the restoration context data.

12 Claims, 20 Drawing Sheets

(51) Int. Cl.
*H04W 48/18* (2009.01)
*H04W 60/06* (2009.01)

(58) Field of Classification Search
CPC ..... H04W 48/20; H04W 60/06; H04W 76/10; H04W 76/18; H04W 76/19; H04W 76/20
See application file for complete search history.

(56) References Cited

U.S. PATENT DOCUMENTS

| | | | |
|---|---|---|---|
| 2019/0230556 A1* | 7/2019 | Lee | H04W 28/16 |
| 2019/0239280 A1* | 8/2019 | Li | H04W 76/12 |
| 2019/0261184 A1* | 8/2019 | Xu | H04W 16/02 |
| 2019/0357301 A1* | 11/2019 | Li | H04W 80/10 |
| 2020/0019852 A1* | 1/2020 | Yoon | G06N 3/088 |
| 2020/0163134 A1* | 5/2020 | Ying | H04W 76/27 |
| 2020/0252785 A1* | 8/2020 | Wu | H04W 8/14 |
| 2020/0288538 A1* | 9/2020 | Lee | H04W 24/02 |
| 2022/0014944 A1* | 1/2022 | Liang | H04W 24/04 |

OTHER PUBLICATIONS

International Search Report and Written Opinion dated Mar. 24, 2020 for International Application No. PCT/EP2020/052744 filed Feb. 4, 2020, consisting of 12-pages.
3GPP TS 23.502 V15.4.1; 3rd Generation Partnership Project; Technical Specification Group Services and System Aspects; Procedures for the 5G System; Stage 2 (Release 15), Jan. 2019, consisting of 347-pages.
3GPP TS 23.501 V15.4.0; 3rd Generation Partnership Project; Technical Specification Group Services and System Aspects; System architecture for the 5G System; Stage 2 (Release 15), Dec. 2018, consisting of 236-pages.
3GPP TS 23.742V16.0.0; 3rd Generation Partnership Project; Technical Specification Group Services and System Aspects; Study on Enhancements to the Service-Based Architecture (Release 16), Dec. 2018, consisting of 131-pages.
3GPP TS 29.501 V15.2.0; 3rd Generation Partnership Project; Technical Specification Group Core and Network Terminals; 5G System; Principles and Guidelines for Services Definition; Stage 3 (Release 15), Dec. 2018, consisting of 66-pages.
3GPP TS 23.502 V15.1.0; 3rd Generation Partnership Project; Technical Specification Group Services and System Aspects; Procedures for the 5G System; Stage 2 (Release 15), Mar. 2018, consisting of 285-pages.
3GPP TSG CT4 Meeting #79 C4-174078; Title: Pseudo-CR on support of stateless NFs; Agenda Item: 6.2.1; Source: Nokia, Alcatel-Lucent Shanghai Bell; Spec: 3GPP TR 29.891 0.3.0; Document for: Decision; Date and Location: Aug. 21-25, 2017, Krakow, Poland, consisting of 4-pages.
3GPP TSG CT4 Meeting #81 C4-176394 Revision of C$-176356, C4-176103; Title: Pseudo-CR on stateless AMF without UDSF; Agenda Item: 6.2.1.1; Source: Huawei; Spec: 3GPP TR 29.891; Document for: Decision; Date and ocation: Nov. 27-Dec. 1, 2017; Reno, US, consisting of 4-pages.

* cited by examiner

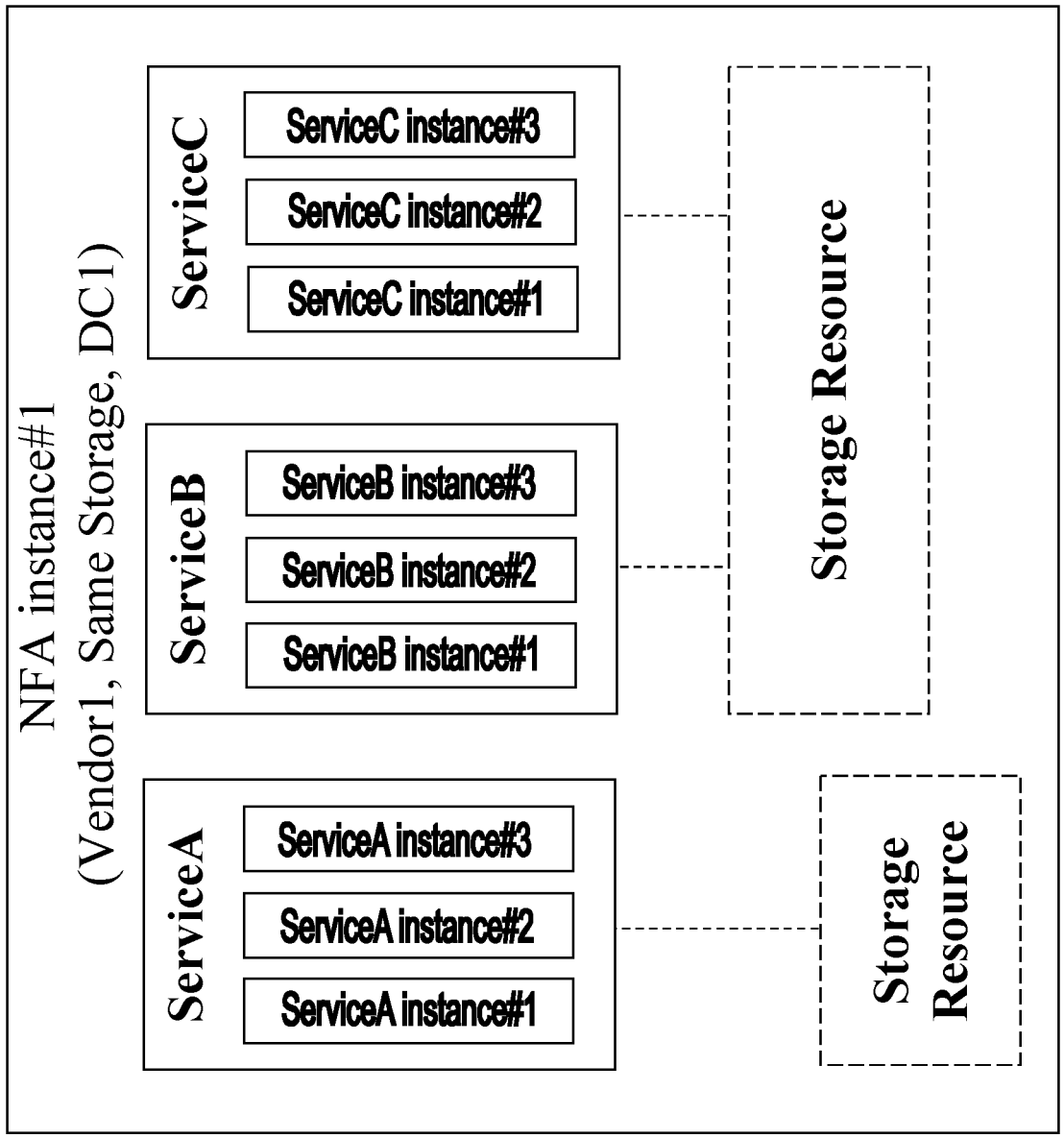
FIG. -1-

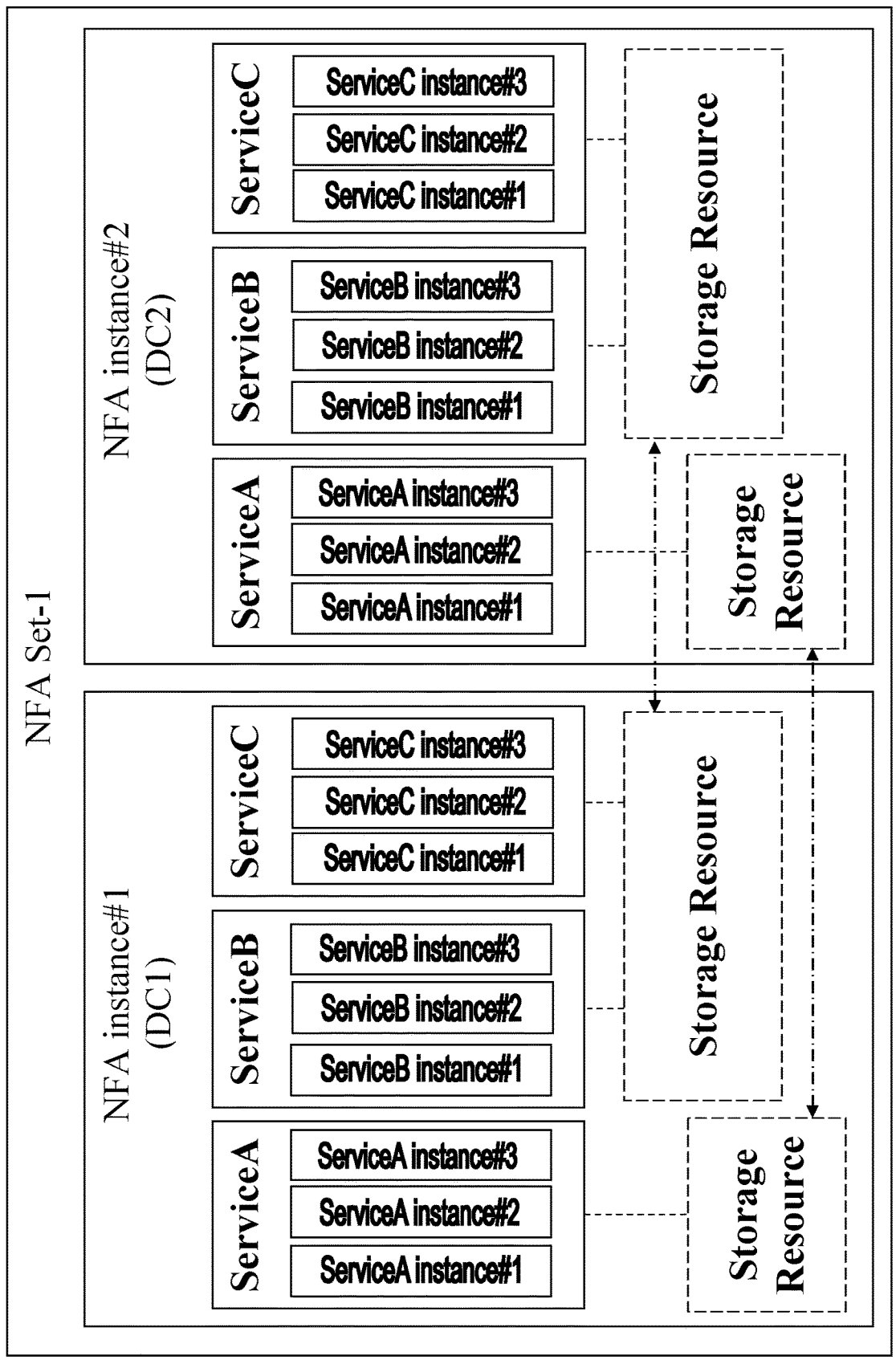
FIG. -2-

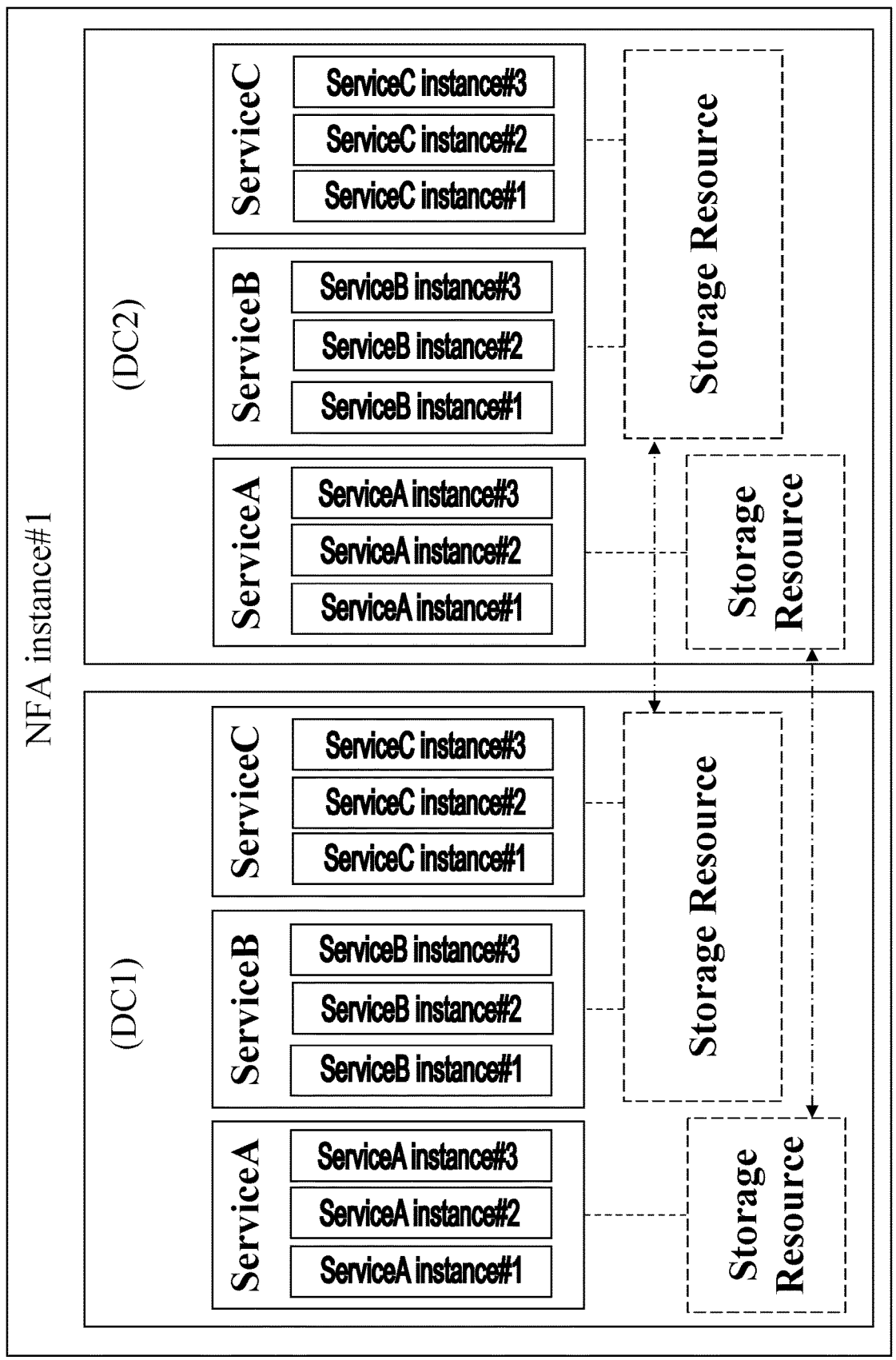
FIG. -3-

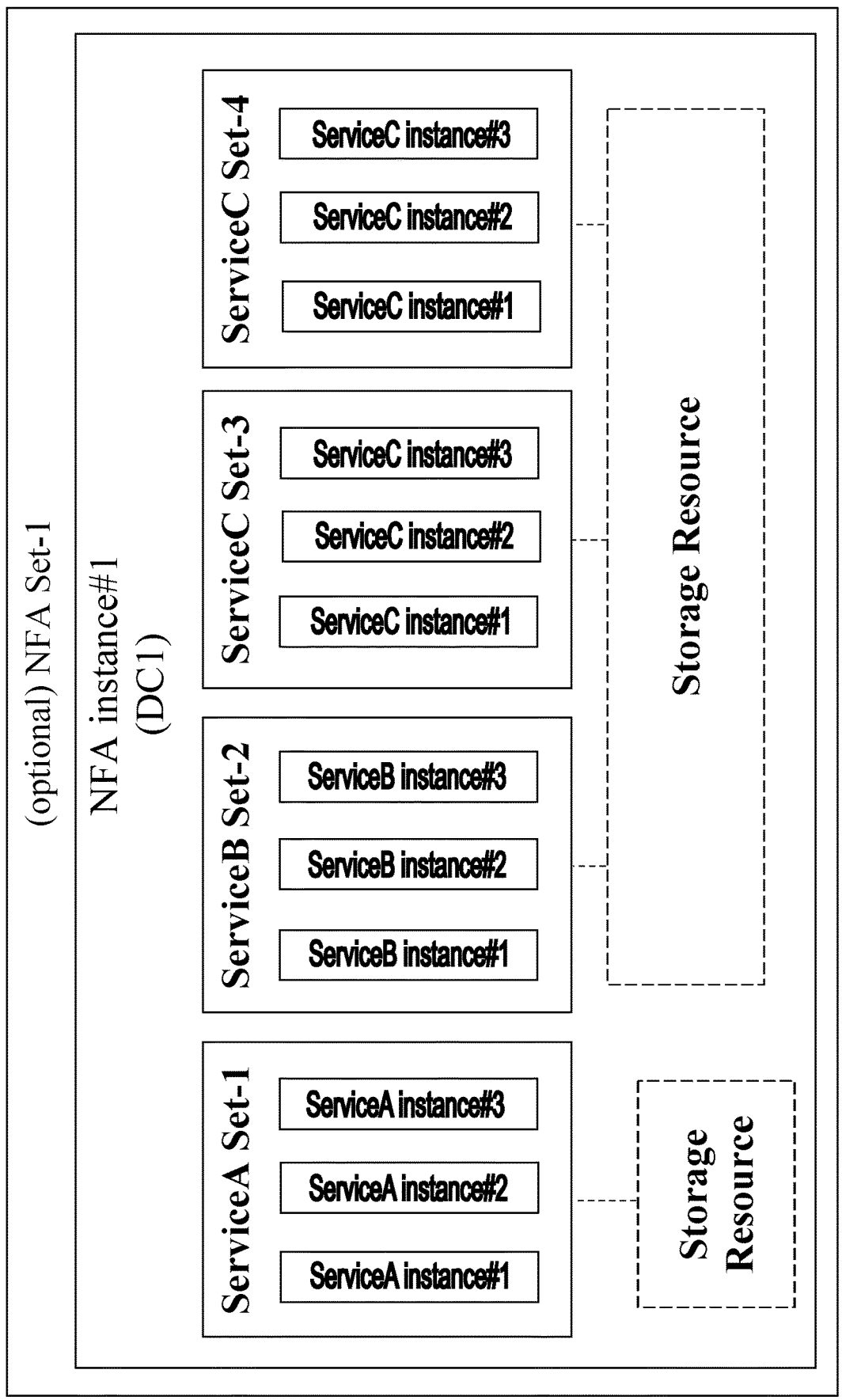
FIG. -4-

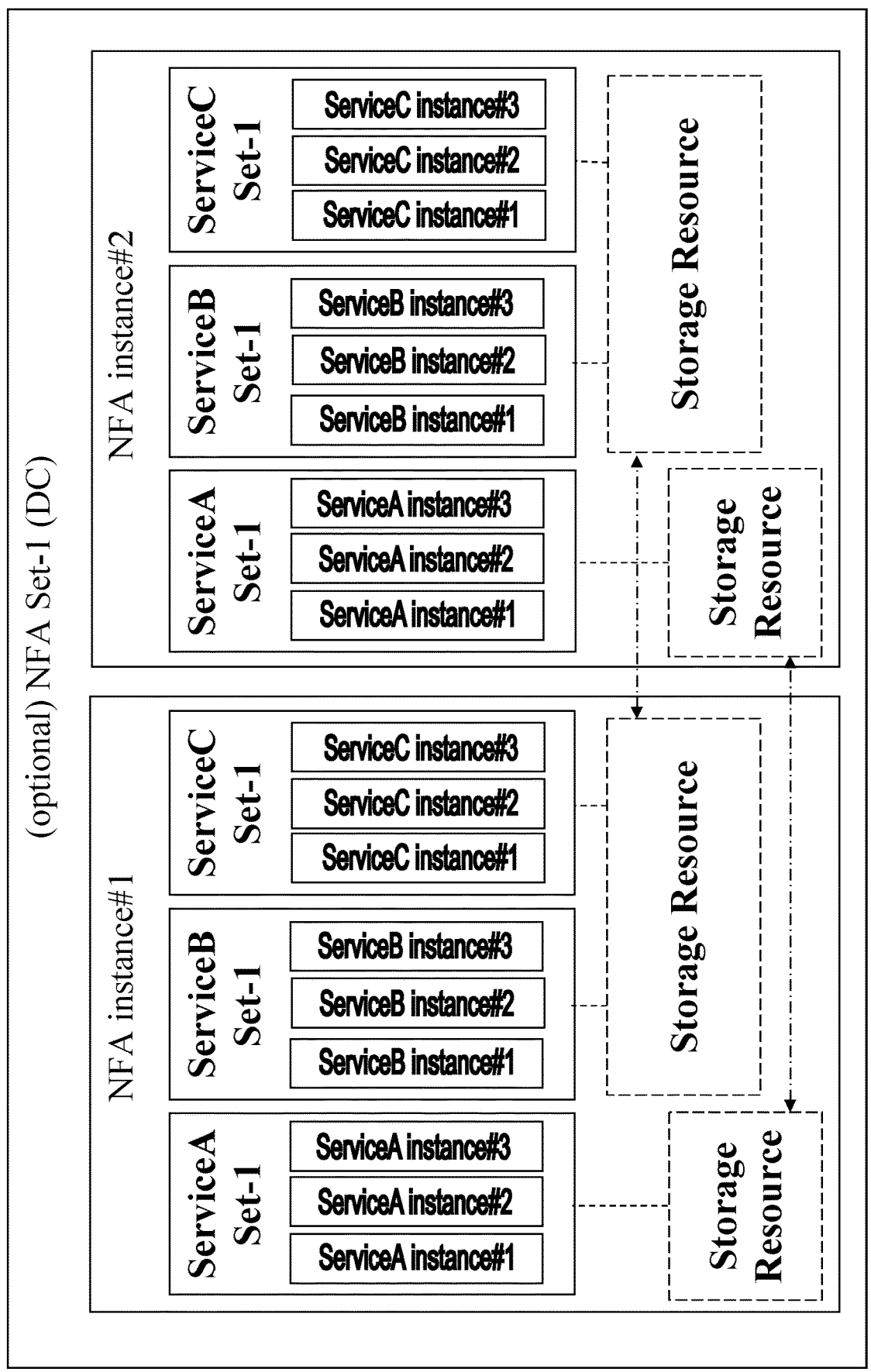
FIG. -5-

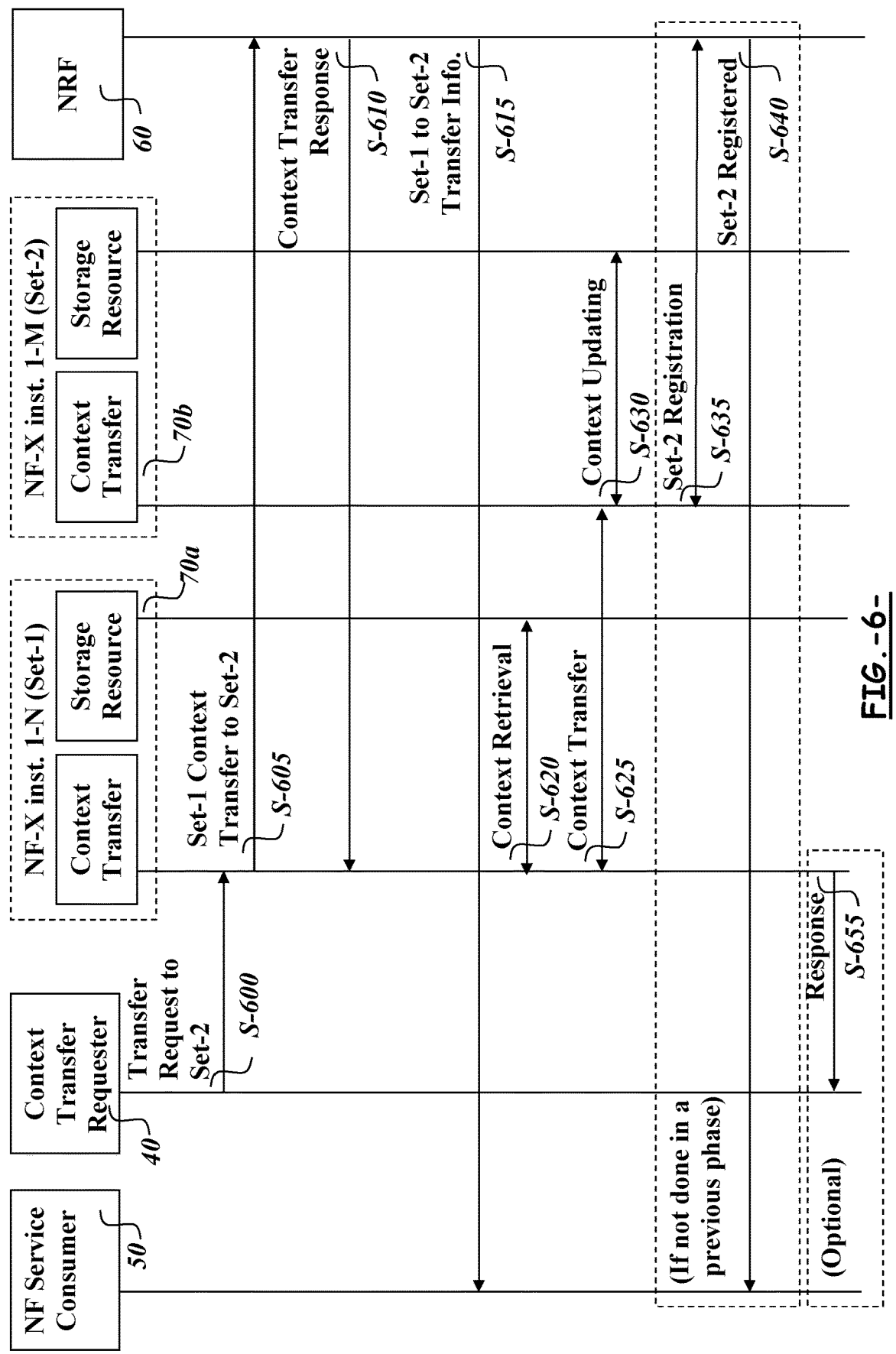
FIG. -6-

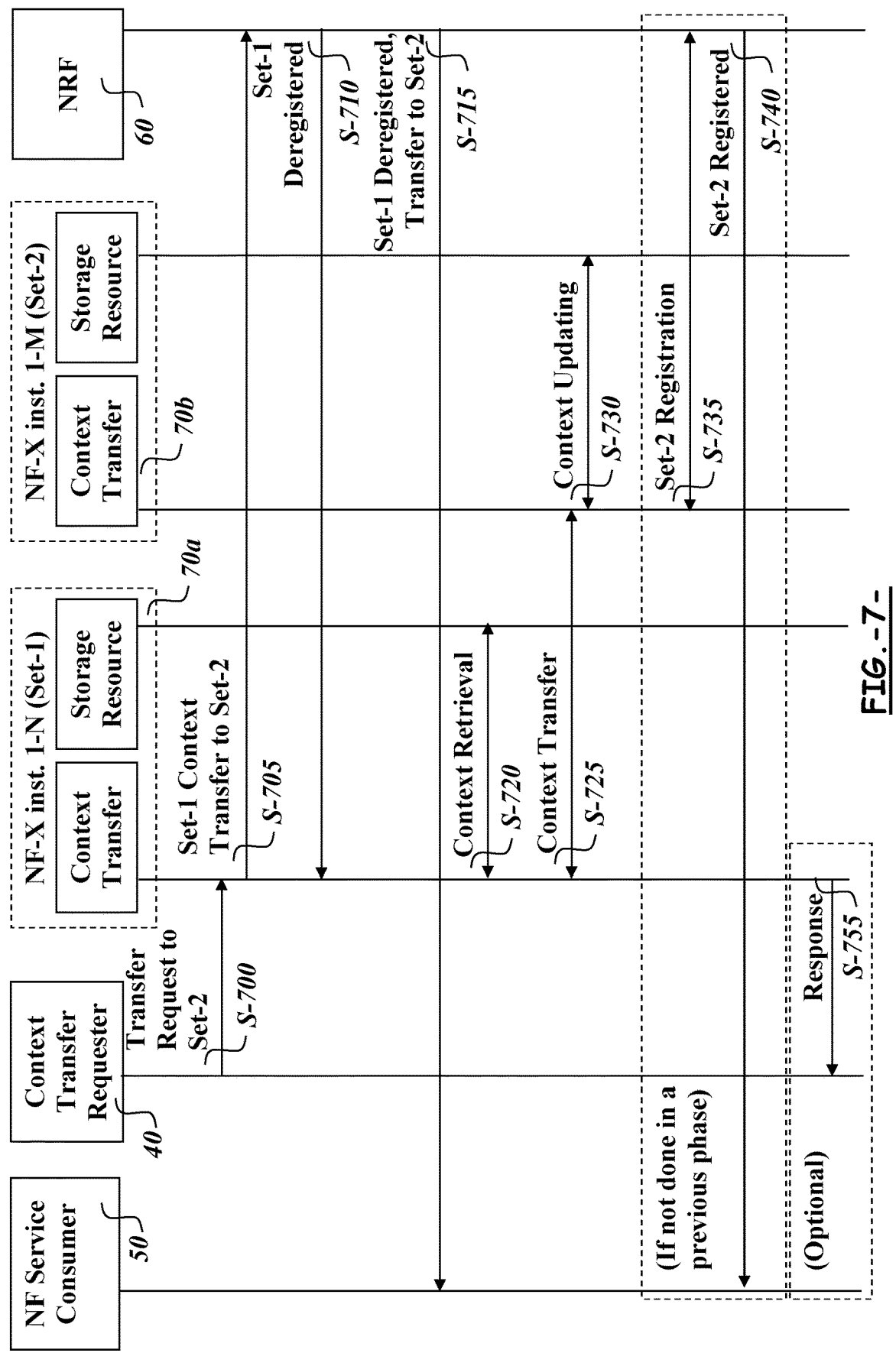
FIG. -7-

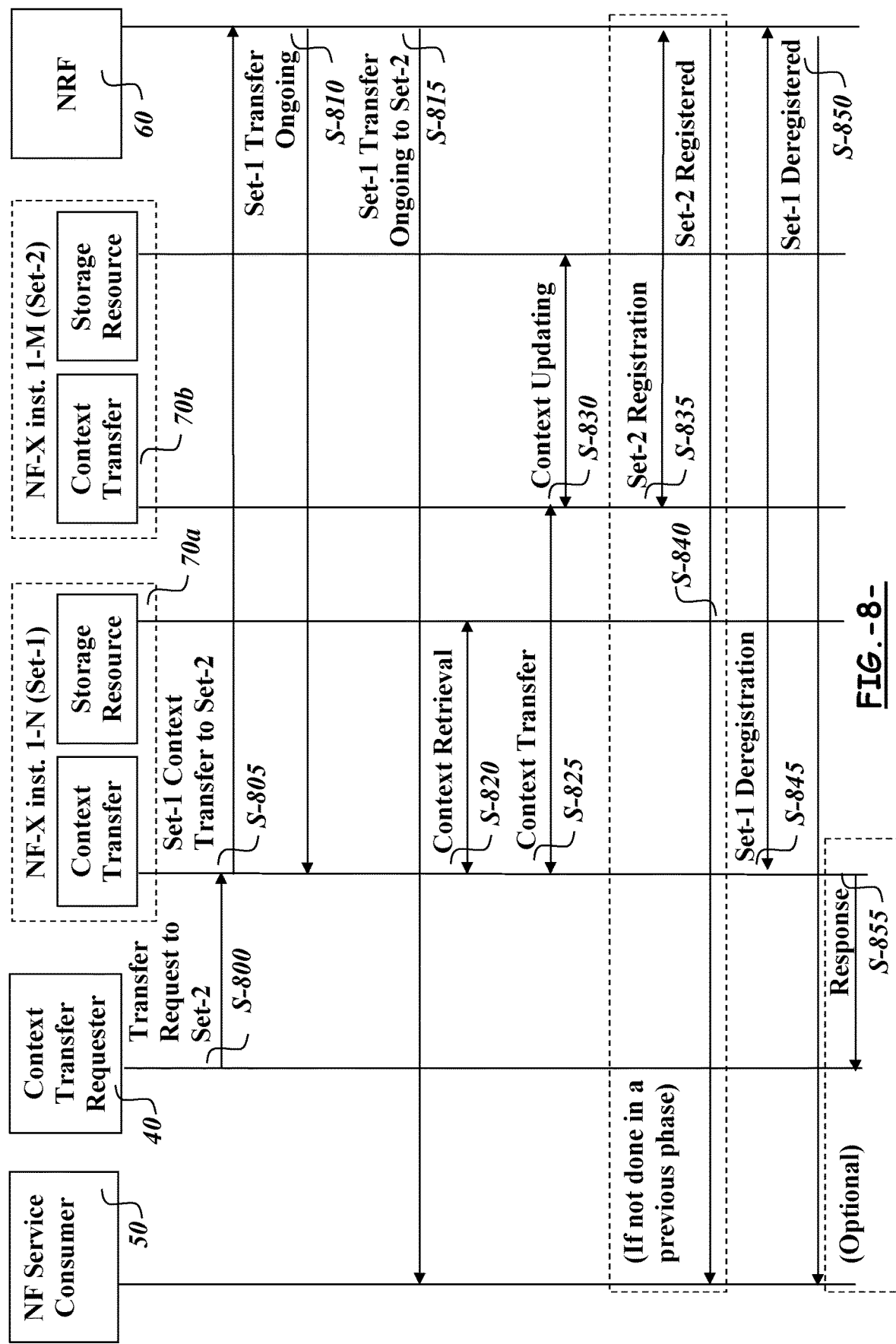
FIG. -8-

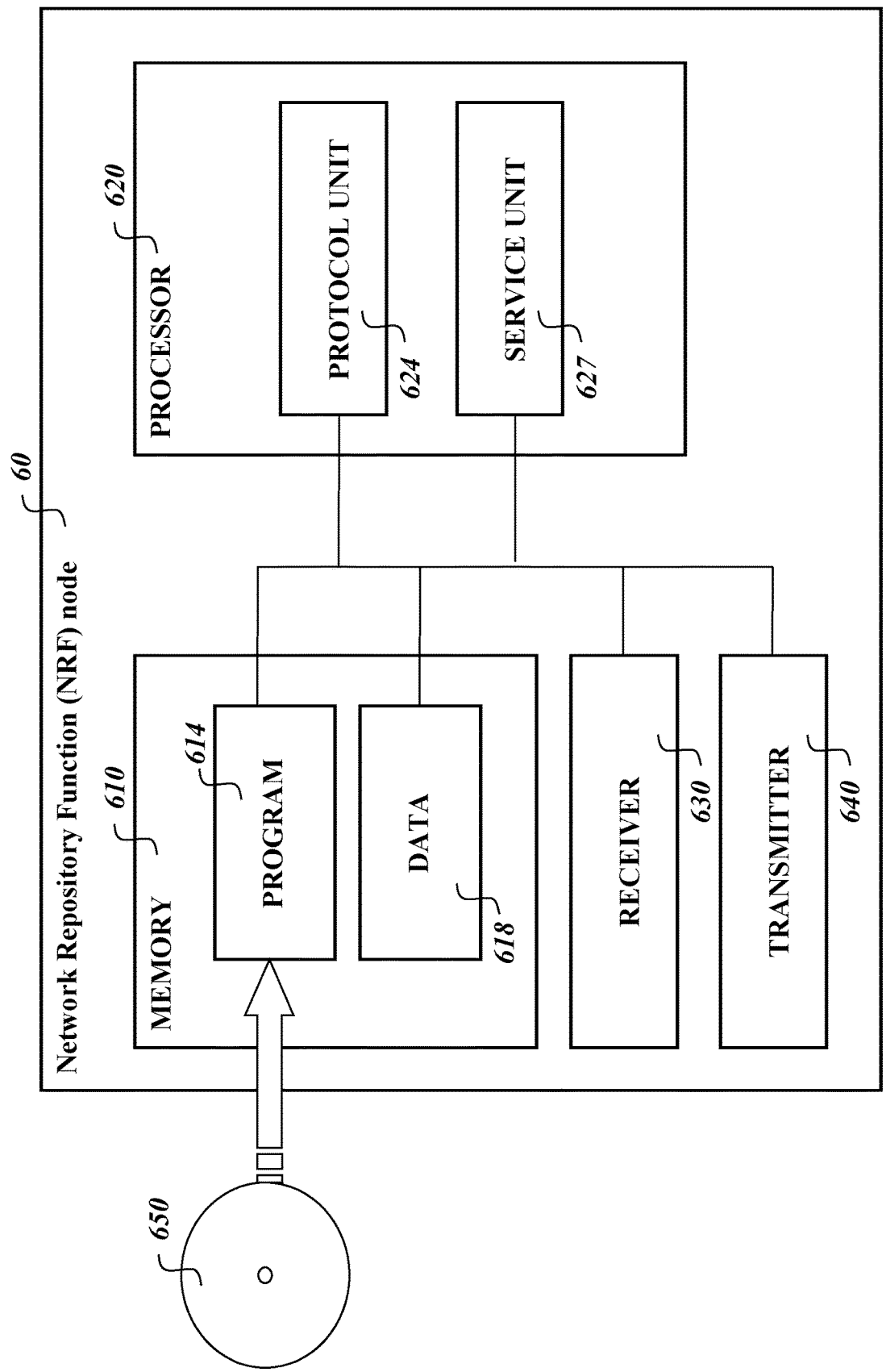
FIG.-9-

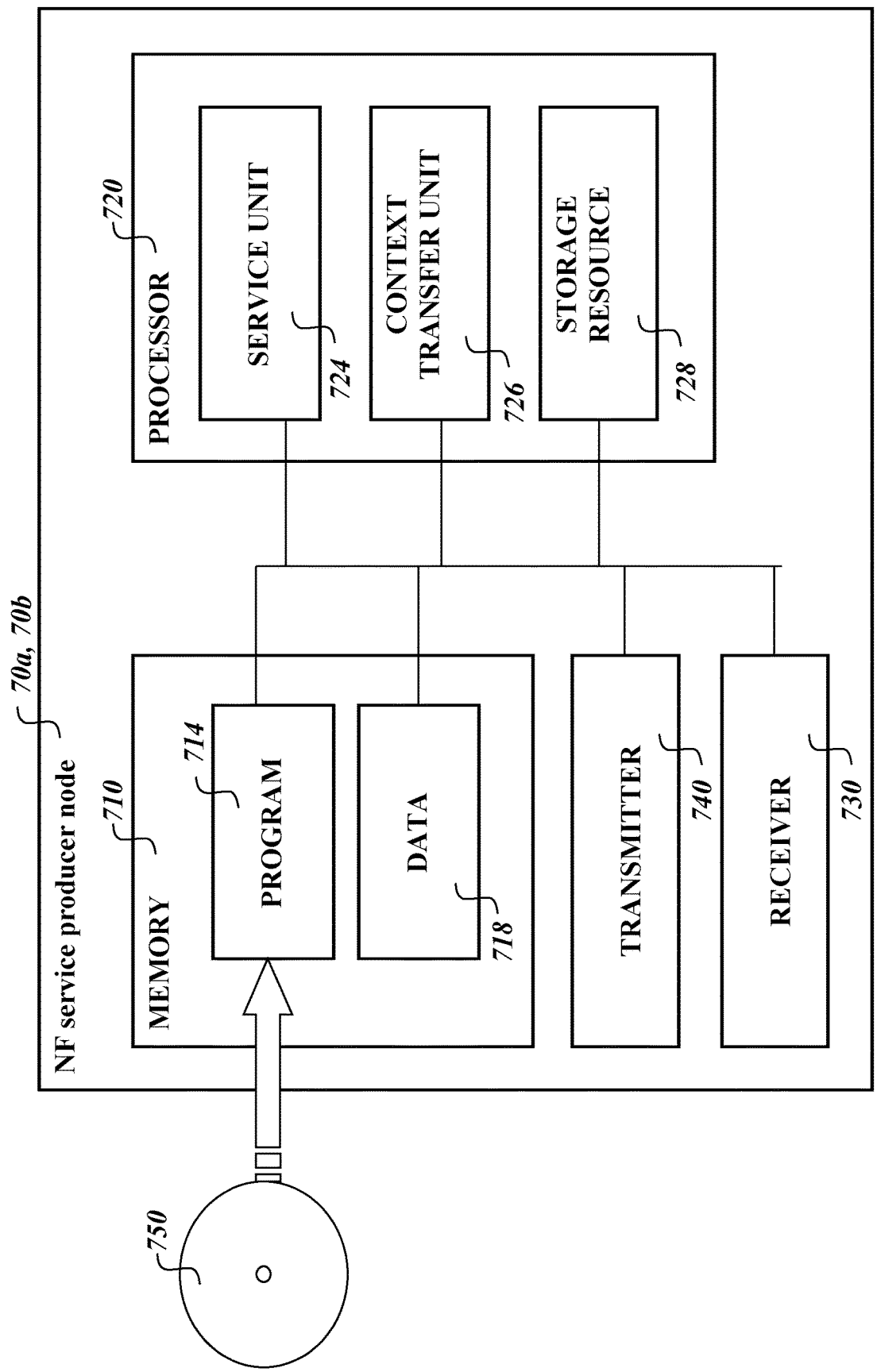
FIG. -10-

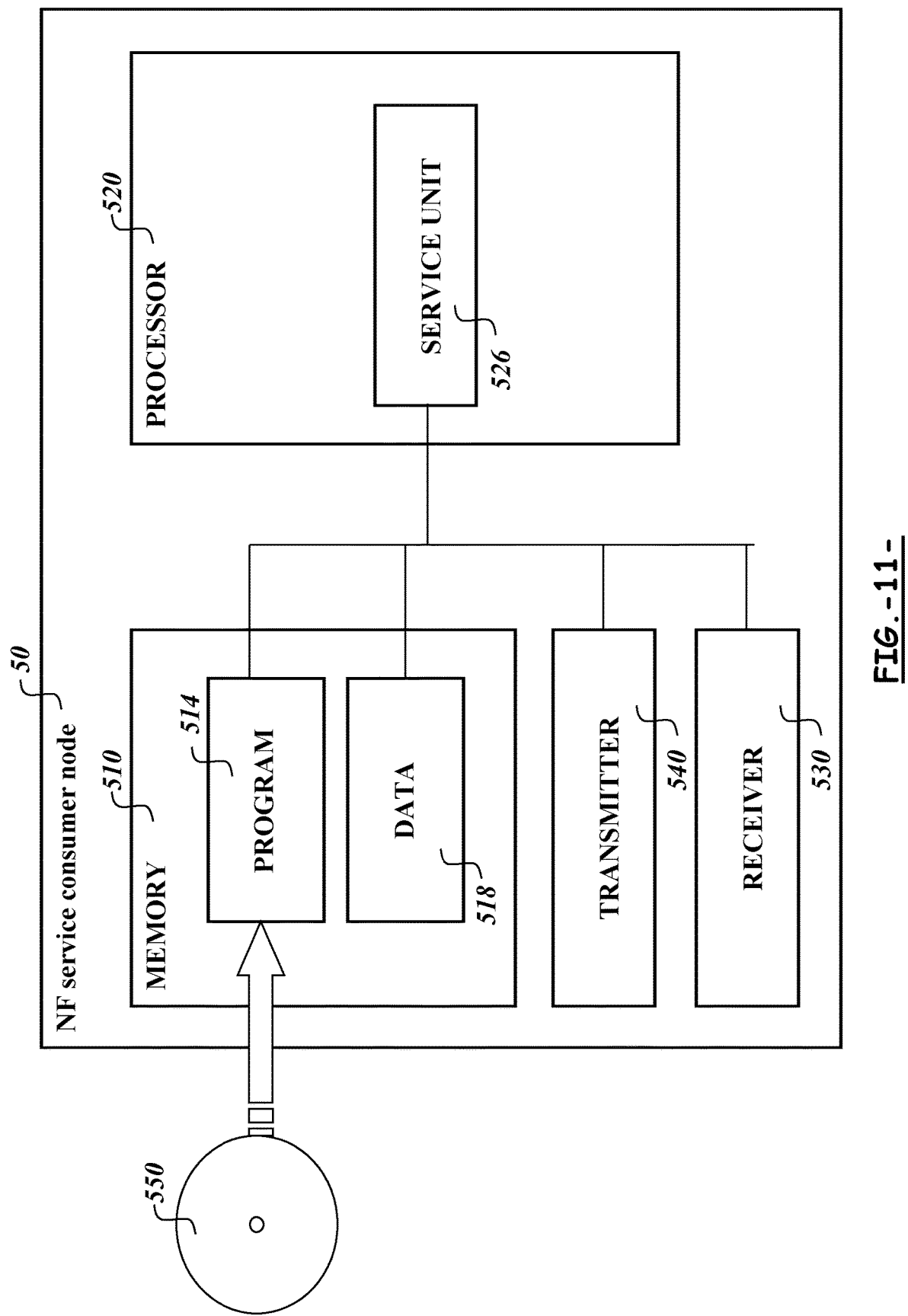
FIG.-11-

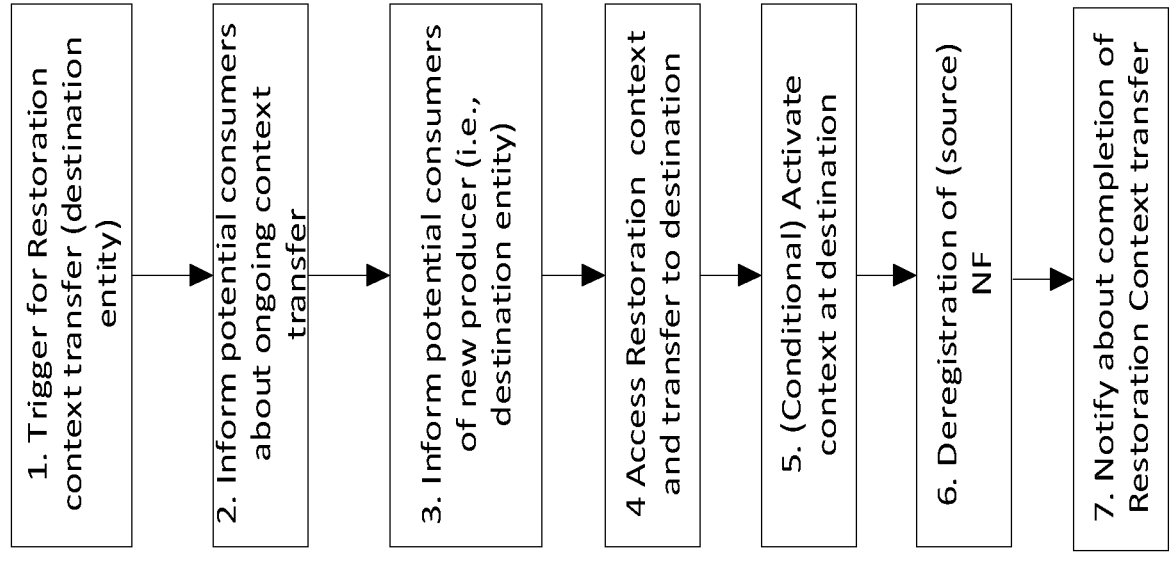
FIG. -13-
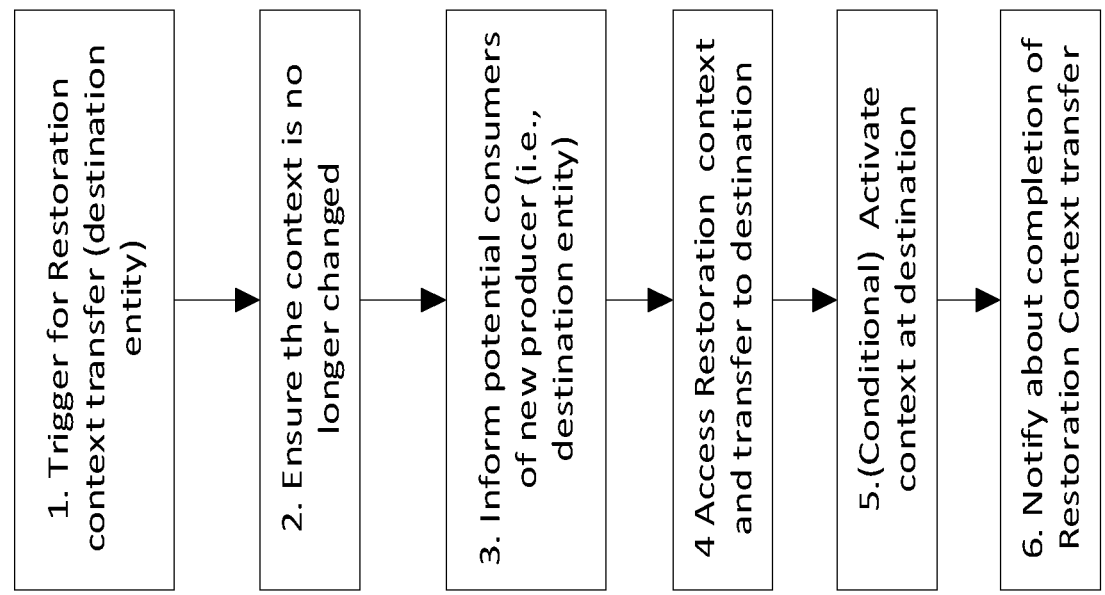
FIG. -12-

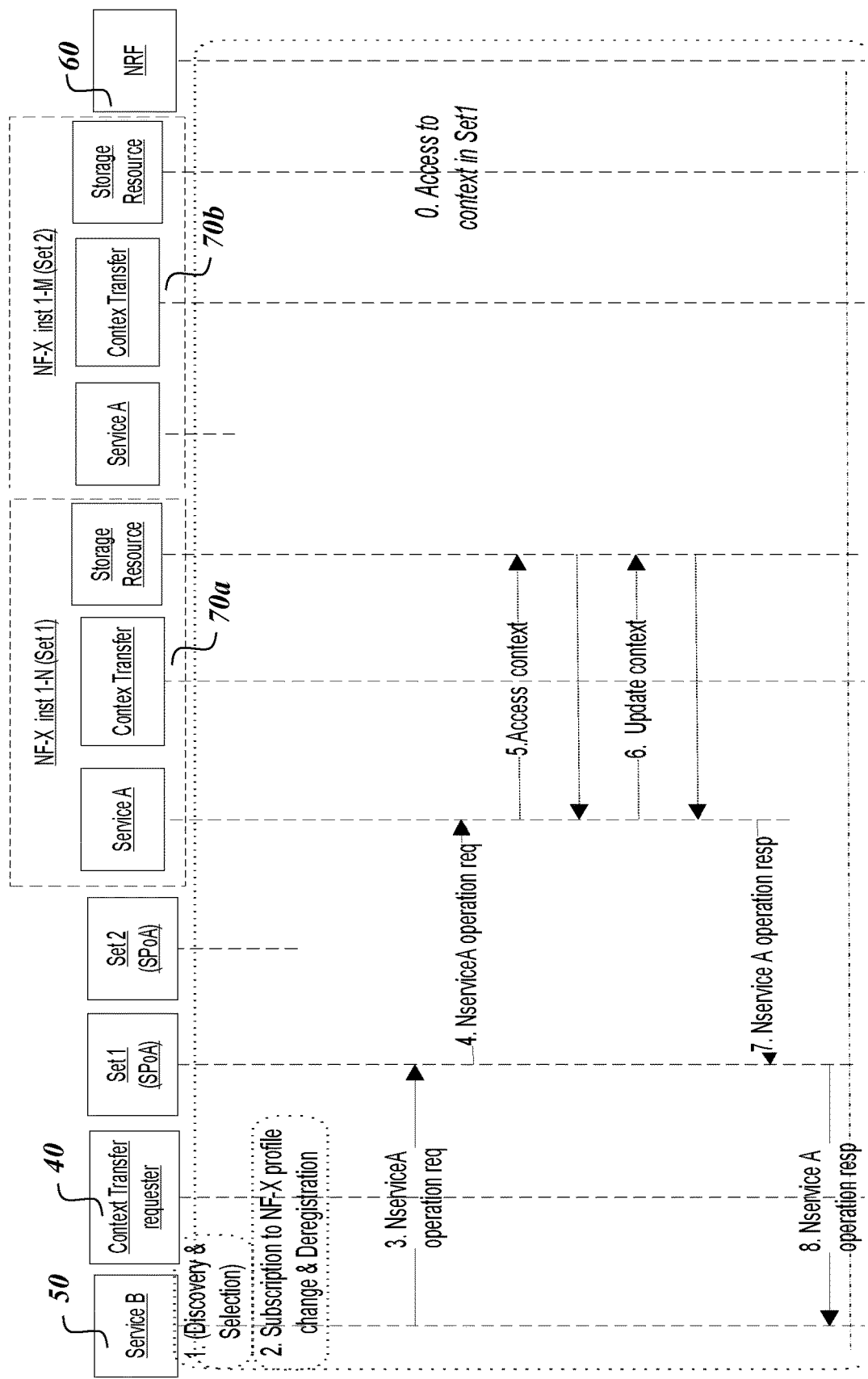
FIG.-14-

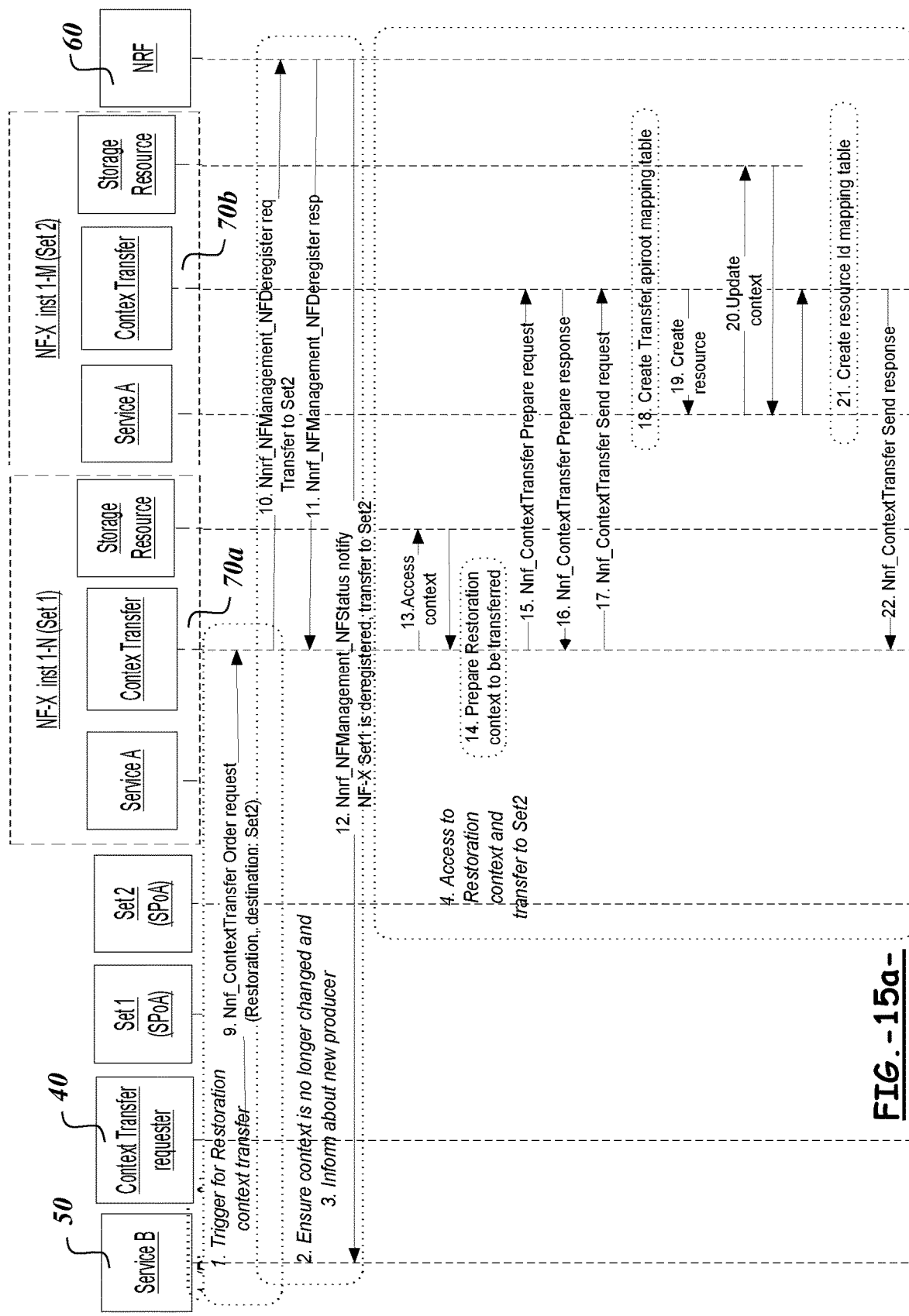
FIG. -15a-

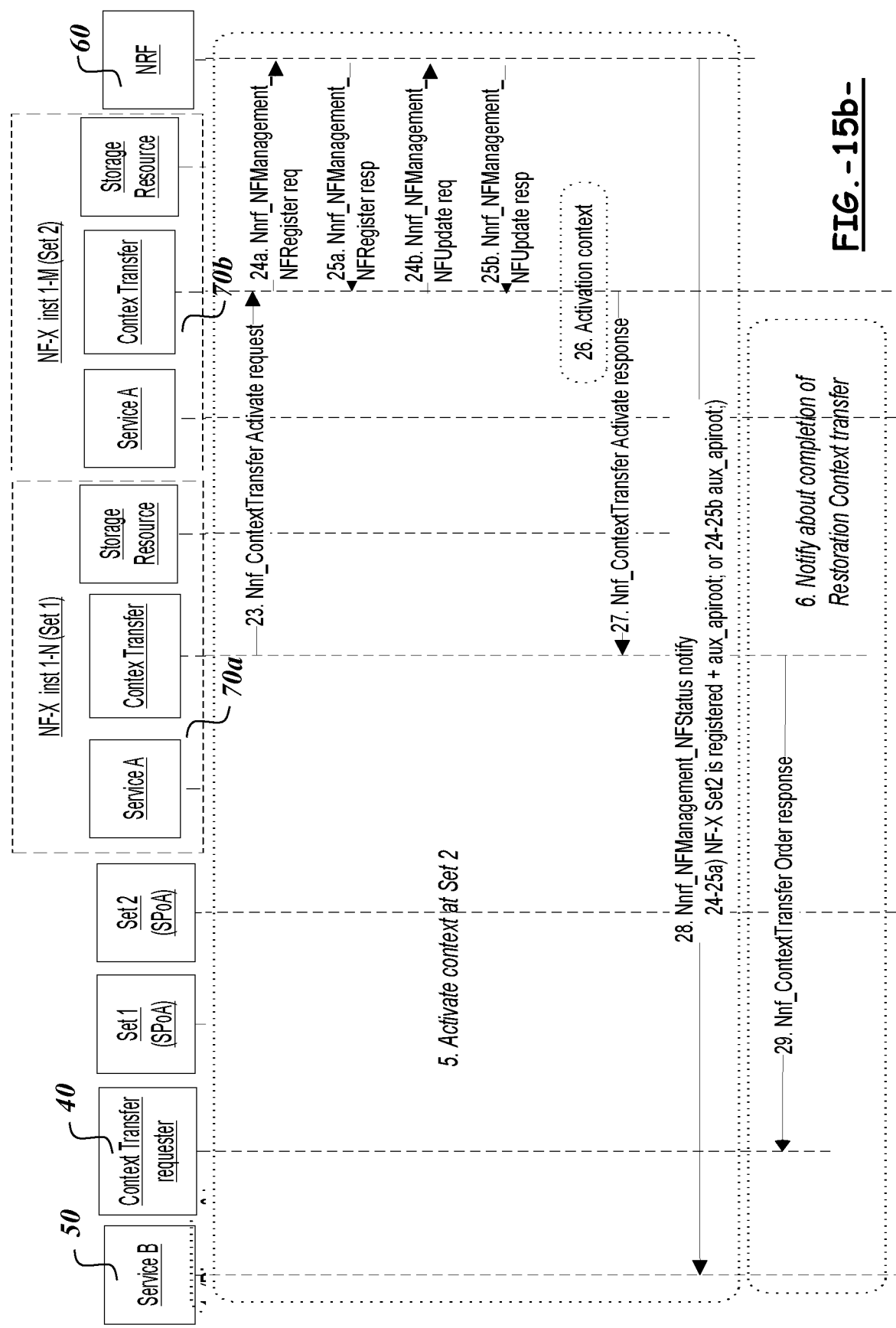
FIG. -15b-

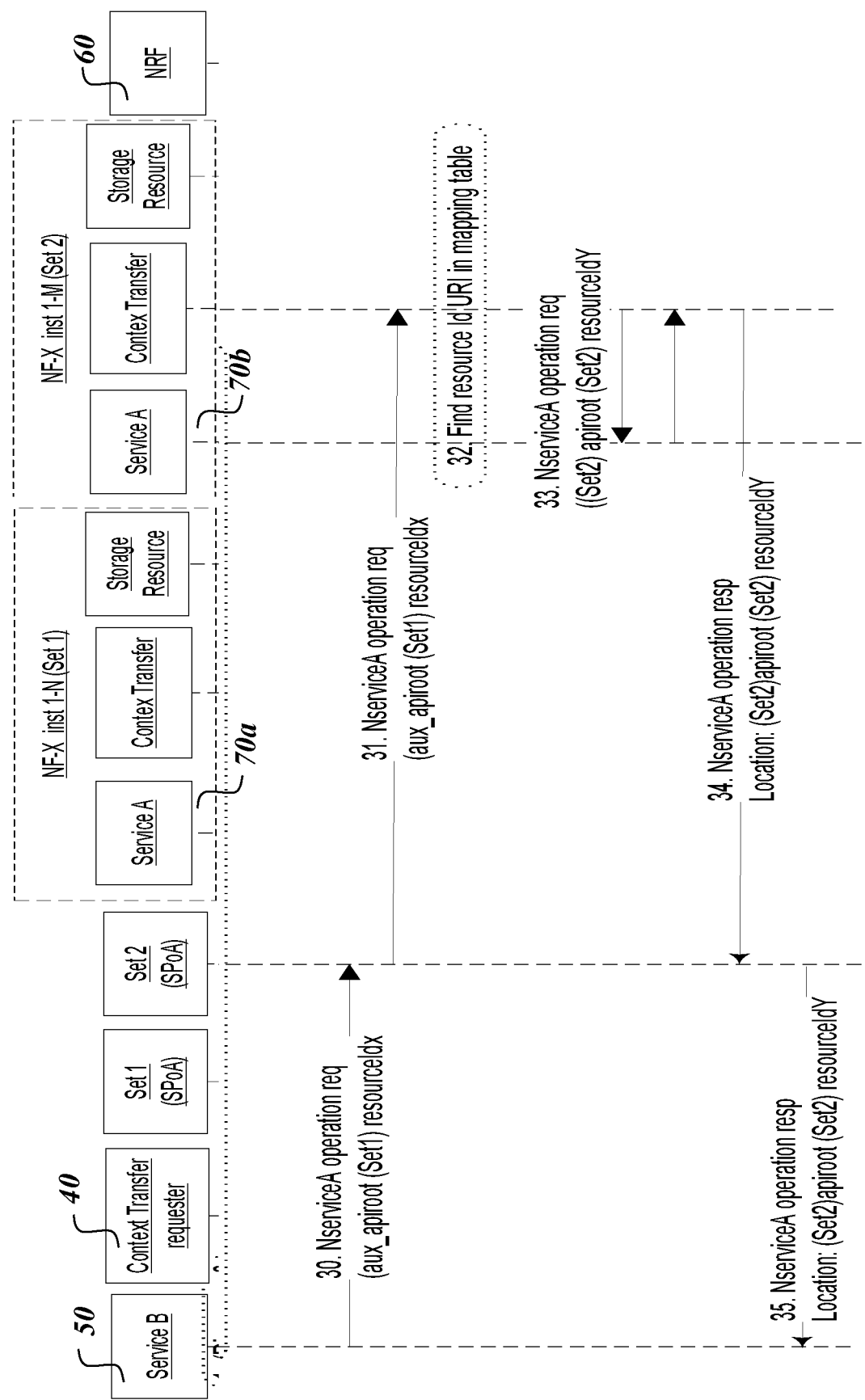
FIG. -15c-

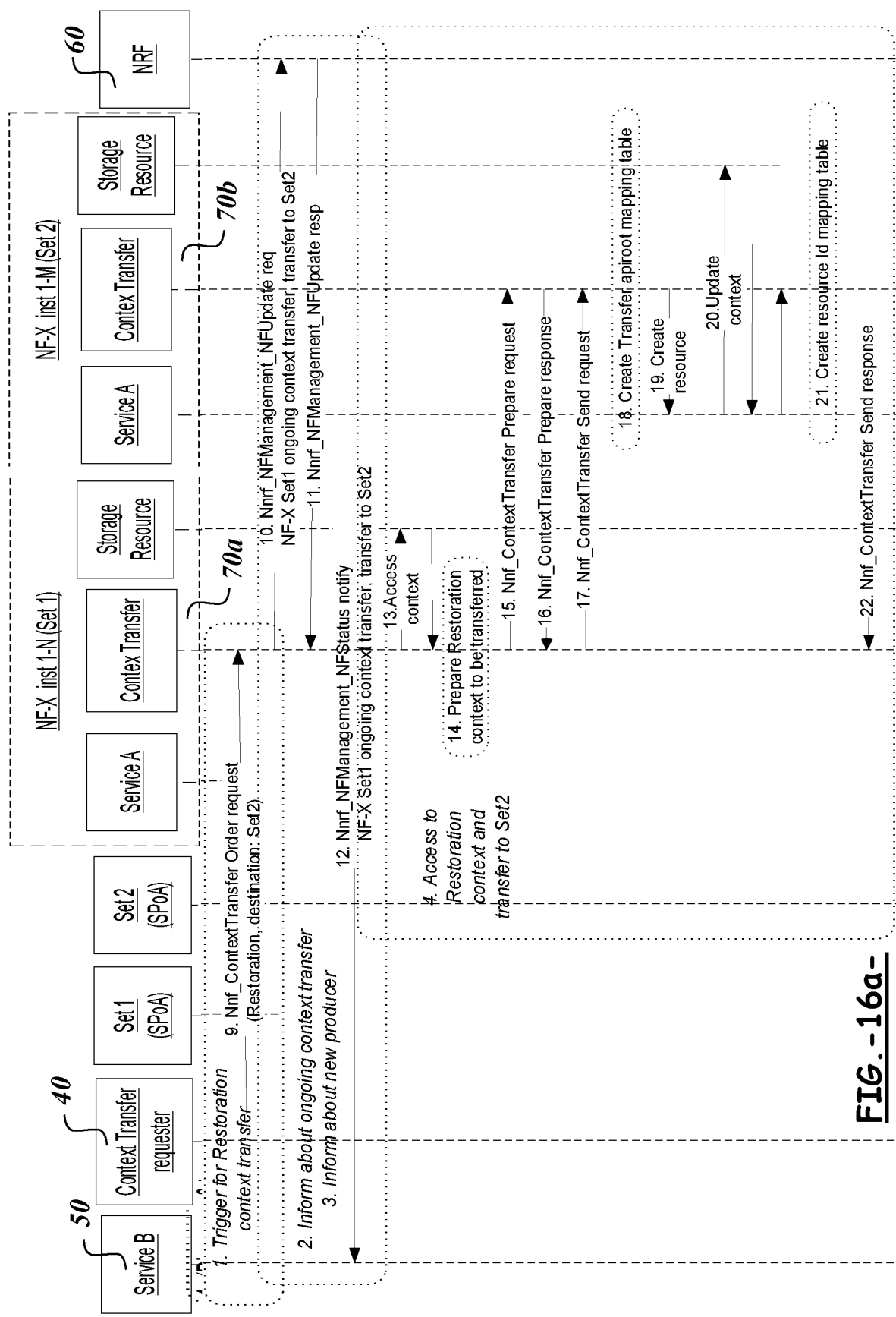
FIG. -16a-

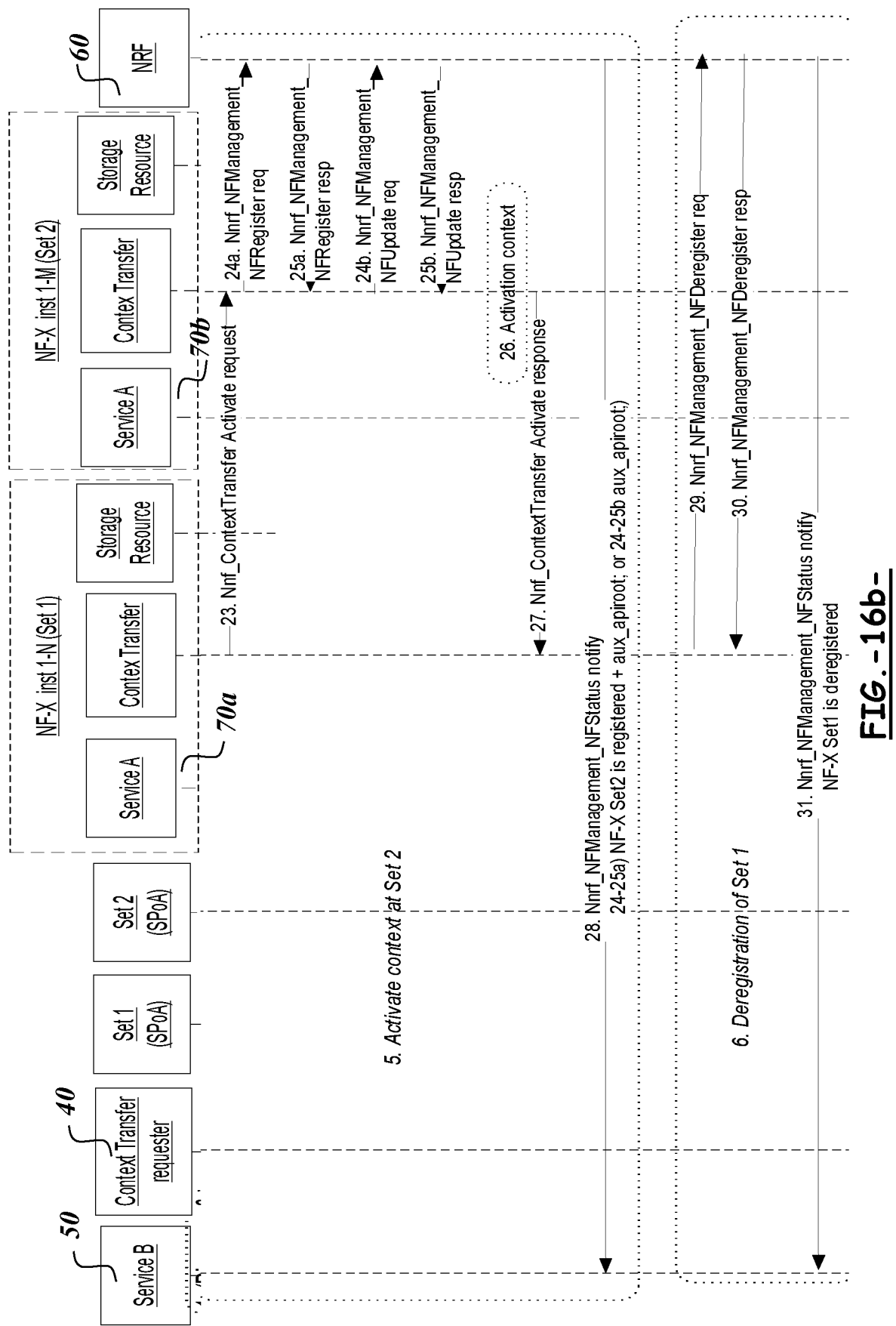
FIG.-16b-

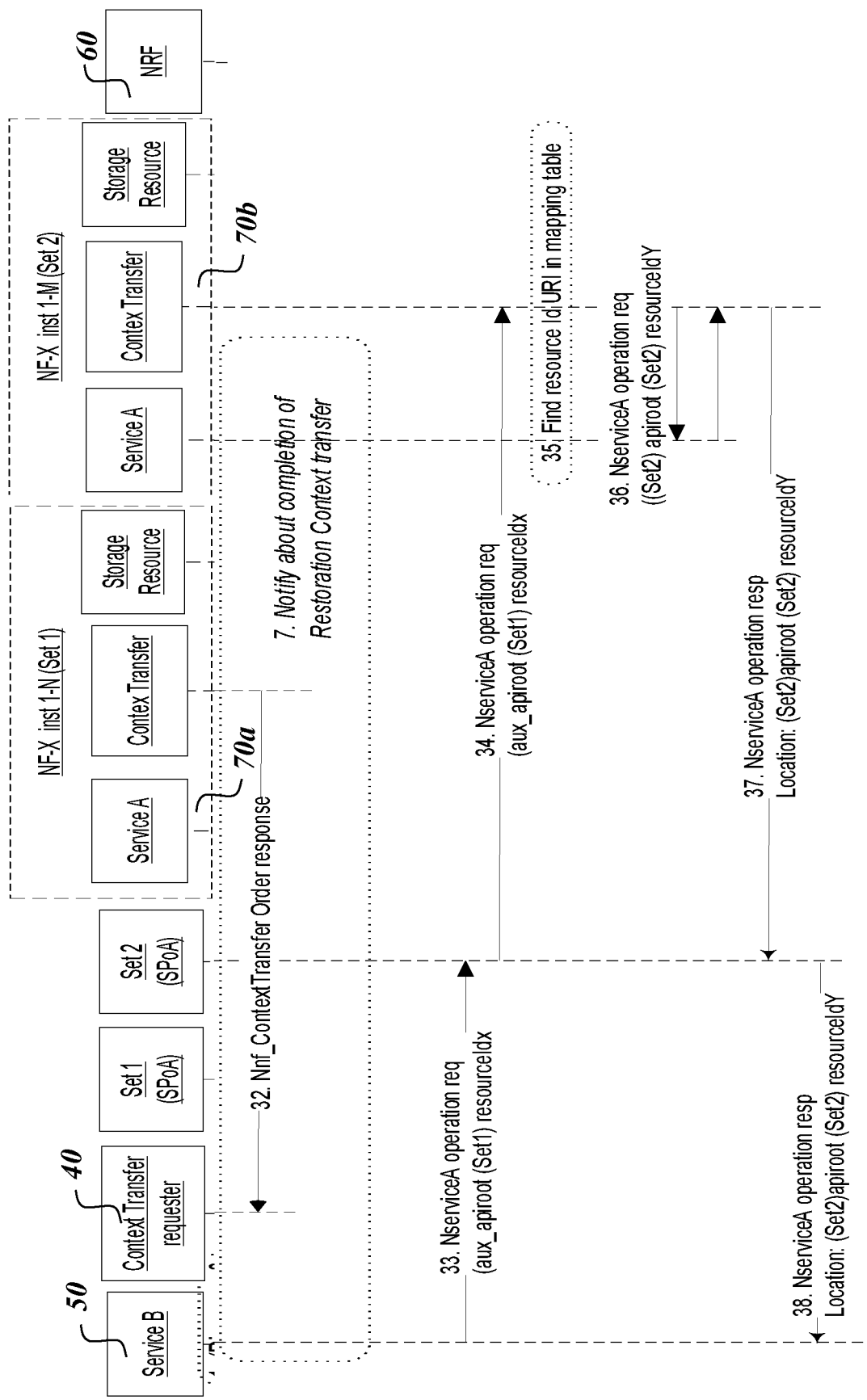
FIG. -16c-

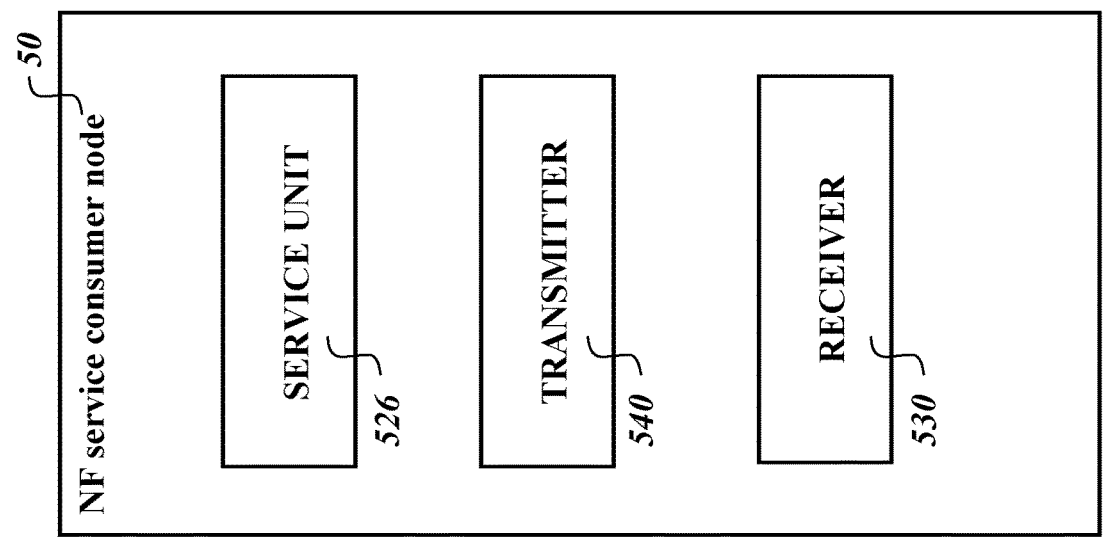
FIG. -19-
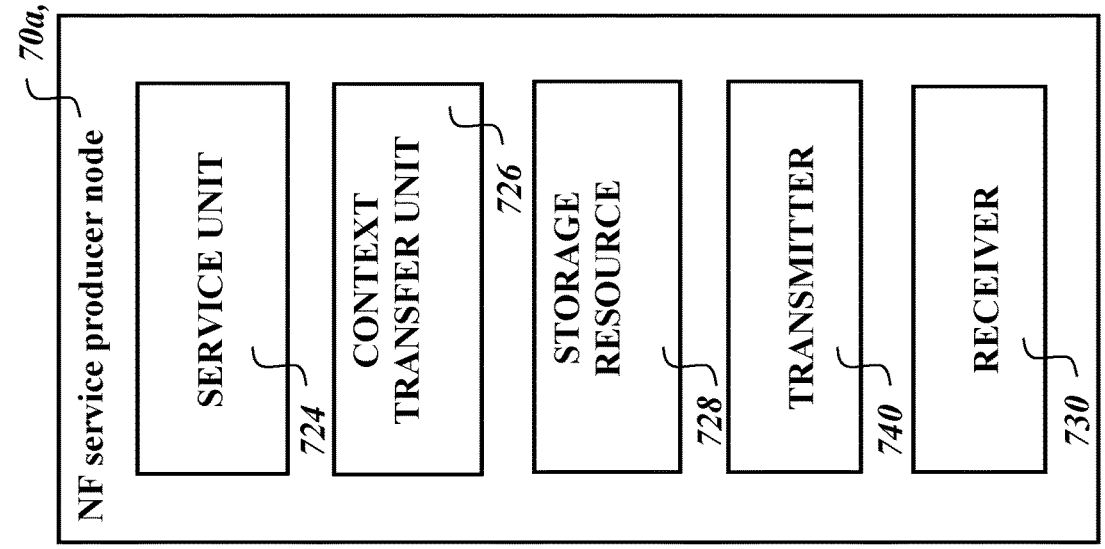
FIG. -18-
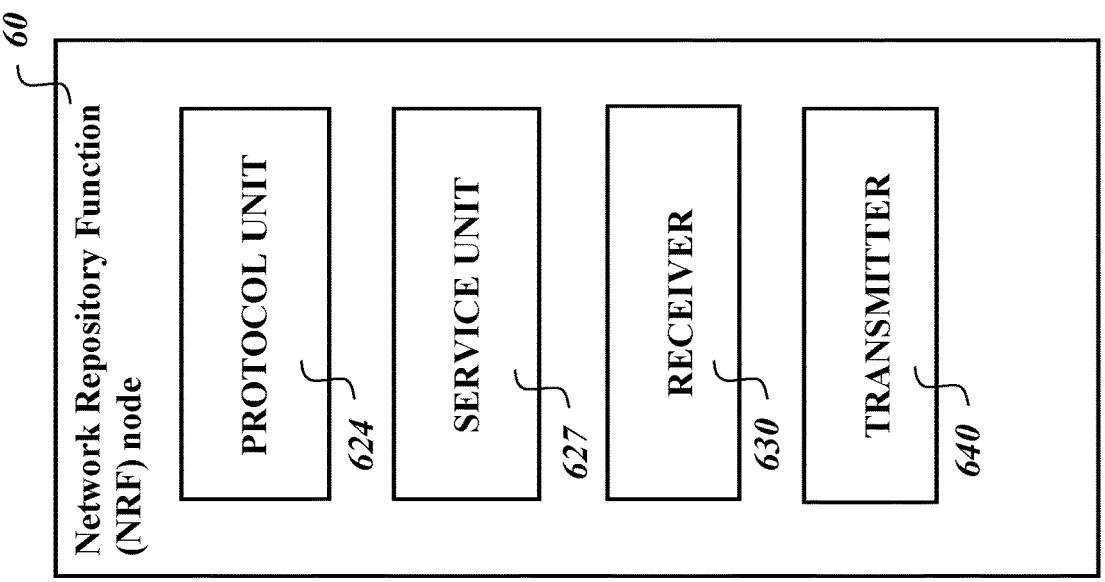
FIG. -17-

METHODS AND APPARATUSES FOR TRANSFERRING RESTORATION CONTEXT DATA

CROSS-REFERENCE TO RELATED APPLICATIONS

This application is a Submission Under 35 U.S.C. § 371 for U.S. National Stage Patent Application of International Application No.: PCT/EP2020/052744, filed Feb. 4, 2020 entitled "METHODS AND APPARATUSES FOR TRANSFERRING RESTORATION CONTEXT DATA," which claims priority to European Application No.: 19382111.3, filed Feb. 18, 2019 titled "METHODS AND APPARATUSES FOR TRANSFERRING RESTORATION CONTEXT DATA," the entireties of both of which are incorporated herein by reference.

TECHNICAL FIELD

The present invention generally relates to restoration; and, more specifically, the invention relates to restoration of context data.

BACKGROUND

The next generation (5G) networks architecture is defined in 3GPP TS 23.501 V15.4.0 and 3GPP TS 23.502 V15.4.1. A key aspect in which the 3GPP networks will differ starting from Release 15 is that the Core Network (CN) architecture is mostly built around the Service Based Architecture (SBA) paradigm. That is, there will be a network domain, basically the CN, in which the different functional components are defined as Services, which are self-contained functionalities that can be changed and modified in an isolated manner, without affecting the others.

The services in 5G CN will likely be built in a stateless way, i.e., the business logic and data context will be separated. This means that the services store their context externally in a proprietary DB. This will enable various cloud infrastructure features like auto-scaling or auto-healing.

3GPP TS 23.501 defines a Network Function (NF) as a 3GPP adopted or 3GPP defined processing function in a 5G network, which has defined functional behaviour and 3GPP defined interfaces. Apart from that, services will be deployed as part of a NF, and multiple NF instances may be deployed in a Set, as long as these instances have access to the same context data.

As illustrated in FIG. 1, one NF instance will be always supplied by a single vendor, including multiple services (as standardized by 3GPP). Each service may be instantiated in a pool and have access to a storage resource that may be shared by other services in the NF instance, but this is up to implementation and deployment, not standardized by 3GPP.

As illustrated in FIG. 2, one or multiple NF instances, in a same or different Data Center (DC), may be deployed in a same NF Set, what means that those instances provide the same business logic and have access to the same data. The access to the same data may be by different means, providing different levels of data consistency, e.g. if replication is required among locally deployed storage resources, this replication may be synchronous or asynchronous.

In order to have access to the same data, being this data not standardized, all the NF instances in an NF Set are by same vendor.

It could be possible as well that an NF instance spans multiple DCs as exemplary illustrated in FIG. 3.

Currently, there is an ongoing discussion in 3GPP that may consider the Service Set concept as well as a standard construct illustrated in FIG. 4. The main difference with FIG. 1 above is that in FIG. 4, the Service Set construct is standardized, while in FIG. 1 the internal pool of instances is managed internally to the NF instance.

Also, a Service Set may span multiple NF instances as exemplary illustrated in FIG. 5.

On the other hand, in the Service Based Architecture (SBA) commented above, each NF (acting as an NF service producer or, simply as an NF producer) may provide one or more services to one or more NF service consumers (or simply NF consumers). An NF producer communicates with an NF consumer via a specific reference point. An NF service is one type of capability exposed by an NF (NF Service Producer) to other authorized NF (NF Service Consumer) through a service-based interface (SBI) or reference point.

A service producer is instantiated to be used by a service consumer instance. The NF discovery and NF service discovery enable one NF to discover a set of NF instances with specific NF service or a target NF type. An NF Repository Function (NRF) supports the NF discovery and NF service discovery. To this end, the NRF receives registration and deregistration from an NF service producer, allows discovery and selection of available NF service producers by an NF service consumer, and authorizes an NF service consumer to access to an NF service producer.

The intention by an operator is to deploy at least two different Sets of the same NF type, each one by different vendors and, then, have the chance to start using Set2, in case Set1 is e.g. decommissioned by O&M or by specific events. In order to continue processing as close as possible from the state that Set1 reached before being decommissioned, some information related to the context stored in Set1 (e.g. UE context or/and PDU session related context) should be transferred to Set2. The context data that is required to be transferred may vary, but in any case, it should be enough to allow the receiver Set, i.e. Set2, to re-build the processing state as close as it was in Set1, that is to allow the receiver to restore internal business logic state in order to continue processing.

At present, a procedure for transferring context data from a first set toward a second set has not been defined yet in 3GPP. In this respect, neither the procedure for transfer nor the subset of attributes to be transferred for each NF type are defined by 3GPP.

Moreover, in view of different constructions discussed above with reference to FIG. 1 to FIG. 5, the issue to solve applies similarly to transferring context for any one of: NF instance, NF set, service instance and service set.

SUMMARY

The present invention is aimed to overcome these drawbacks and provides for methods and network nodes for transferring restoration context data from a first network functional set, NFS, toward a second NFS.

Throughout this specification, both first NFS and second NFS correspond to any one of: a network function, NF, instance; an NF set comprising one or more NF instances; a service instance; and a service set comprising one or more service instances.

That is, the generic term network functional set, NFS, represents any specific term (NF instance, NF set, service instance, service set) where the scope of the invention can be applied.

The context data, e.g. UE context or/and PDU session related context, that is required to be transferred may vary but, in any case, it should be enough to allow the receiver, e.g. the second NFS, to re-build the internal business logic processing state as close as it was in the first NFS. So, the specific context data to be transferred depends on the specific NF business logic, and also on the restoration procedures implemented in the receiver based on the transferred data. This context to be transferred is hereinafter referred to as Restoration Context.

In accordance with a first aspect, there is provided for a method for transferring restoration context data from a first network functional set, NFS, toward a second NFS.

This method comprises receiving, at the first NFS from a context transfer requester, a transfer request indicating transfer of context data toward the second NFS; transmitting, from the first NFS toward an NRF a context transfer request indicating transfer of context data from the first NFS to the second NFS; transmitting, from the NRF toward the first NFS, a context transfer response indicating a status of the first NFS; notifying, from the NRF toward an NF service consumer, of transfer information related to the transfer of context data from the first NFS to the second NFS; transferring, from the first NFS toward the second NFS, restoration context data; and storing, at the second NFS, the restoration context data.

In this method, transferring the restoration context data, from the first NFS toward the second NFS, may comprises retrieving, at a first context transfer module of the first NFS from a first storage resource of the first NFS, the restoration context data, and transferring, from the first context transfer module toward a second context transfer module of the second NFS, the restoration context data.

In this method, storing, at the second NFS, the restoration context data, may comprise updating the restoration context data, from the second context transfer module toward a second storage resource of the second NFS.

In this method, both first NFS and second NFS may correspond to any one of: a network function, NF, instance; an NF set comprising one or more NF instances; a service instance; and a service set comprising one or more service instances.

In this method, the restoration context data may comprise any one of: user equipment, UE, related data and protocol data unit, PDU, session related data.

In an embodiment of this method, the context transfer response, transmitted from the NRF toward the first NFS, may indicate that the first NFS is deregistered.

In this embodiment, the transfer information related to the transfer of context data, notified from the NRF toward the NF service consumer, may comprise a first indication indicating that the first NFS is deregistered and a second indication indicating transfer to the second NFS.

In this embodiment, the context transfer request, received at the NRF from the first NFS, may correspond to a deregistration request for the first NFS.

In another embodiment of this method, the context transfer response, transmitted from the NRF toward the first NFS, may indicate that the transfer of context data from the first NFS is ongoing.

In this another embodiment, the transfer information related to the transfer of context data, notified from the NRF toward the NF service consumer, may comprise a first indication indicating that the transfer of context data from the first NFS is ongoing and a second indication indicating transfer to the second NFS.

In this another embodiment, the context transfer request, received at the NRF from the first NFS, may comprise a request to mark the transfer of context data from the first NFS as being ongoing. Further in this another embodiment, this method may comprise transmitting, from the first NFS toward the second NFS, an activation request indicating that the transfer of context data from the first NFS is completed; and transmitting, from the second NFS toward the NRF, a request to reset the mark of the transfer of context data being ongoing.

In this another embodiment, the method may further comprise transmitting, from the first NFS toward the NRF, a deregistration request to deregister the first NFS; and notifying, from the NRF toward the NF service consumer (50), of deregistration of the first NFS.

Irrespective of the embodiments discussed above, this method may further comprise registering, from the second NFS toward the NRF, the second NFS; and notifying the NF service consumer, from the NRF, of the second NFS registration.

Irrespective of the embodiments discussed above, this method may further comprise transmitting, from the first NFS toward the context transfer requester, a transfer response indicating completion of the requested transfer.

Participating in the method discussed above, there are provided for an NRF node, a first NFS node, a second NFS node, and an NF service consumer node.

Thus, in accordance with a second aspect, there is provided for an NRF node configured to assist in transferring restoration context data from a first NFS node toward a second NFS node.

This NRF node further is configured to: receive, from the first NFS node via a receiver, a context transfer request indicating transfer of context data from the first NFS node to the second NFS node; transmit, toward the first NFS node via a transmitter, a context transfer response indicating a status of the first NFS; and notify, an NF service consumer node via the transmitter, of transfer information related to the transfer of context data from the first NFS node to the second NFS node.

This NRF node is further configured to perform the steps involving the NRF node for the method discussed above.

In accordance with a third aspect, there is provided for a first NFS node configured to assist in transferring restoration context data from the first NFS node toward a second NFS node.

This first NFS node further is configured to: receive, from a context transfer requester via a receiver, a transfer request indicating transfer of context data toward the second NFS node; transmit, toward an NRF node via a transmitter, a context transfer request indicating transfer of context data from the first NFS node to the second NFS node; receive, from the NRF node via the receiver, a context transfer response indicating a status of the first NFS; and transfer, from the first NFS node toward the second NFS node, restoration context data.

This first NFS node is further configured to perform the steps involving the first NFS node for the method discussed above.

In accordance with a fourth aspect, there is provided for a second NFS node configured to assist in transferring restoration context data from a first NFS node toward the second NFS node.

This second NFS node further is configured to: receive, from the first NFS node via a receiver, transferred restoration context data; and store, at a storage resource, the restoration context data.

This second NFS node is further configured to perform the steps involving the second NFS node for the method discussed above.

In accordance with a fifth aspect, there is provided for an NF service consumer node configured to assist in transferring restoration context data from a first NFS node toward a second NFS node.

This NF service consumer node further is configured to receive, from an NRF node, a notification of transfer information related to the transfer of context data from the first NFS node to the second NFS node.

This NF service consumer node is further configured to perform the steps involving the NF service consumer node for the method discussed above.

BRIEF DESCRIPTION OF THE DRAWINGS

The features, objects and advantages of the invention will become apparent by reading this description in conjunction with the accompanying drawings, in which:

FIG. 1 represents a basic and exemplary construction of an NF instance.

FIG. 2 represents a basic and exemplary construction of an NF set with more than one NF instance.

FIG. 3 illustrates an NF instance spanning multiple DCs.

FIG. 4 represents a basic and exemplary construction of a service set with an NF instance.

FIG. 5 illustrates a service set spanning multiple NF instances.

FIG. 6 illustrates an exemplary sequence of actions carried out for transferring restoration context data from a first NFS toward a second NF S.

FIG. 7 illustrates an exemplary sequence of actions carried out, in accordance with an embodiment, for transferring restoration context data from a first NFS toward a second NFS.

FIG. 8 illustrates an exemplary sequence of actions carried out, in accordance with another embodiment, for transferring restoration context data from a first NFS toward a second NFS.

FIG. 9 shows a basic component structure of an NRF node in accordance with an embodiment.

FIG. 10 shows a basic component structure of an NF service producer node in accordance with an embodiment.

FIG. 11 shows a basic component structure of an NF service consumer node in accordance with an embodiment.

FIG. 12 illustrates a basic flowchart of actions carried out, in accordance with an embodiment, for transferring restoration context.

FIG. 13 illustrates a basic flowchart of actions carried out, in accordance with another embodiment, for transferring restoration context.

FIG. 14 illustrates a legacy sequence of actions carried out for accessing an NF instance in a set.

FIGS. 15a, 15b and 15c illustrate a detailed and exemplary sequence of actions that may be carried out, in accordance with the embodiment illustrated in FIG. 7, for transferring restoration context data from a first NFS toward a second NFS.

FIGS. 16a, 16b and 16c illustrate a detailed and exemplary sequence of actions that may be carried out, in accordance with the embodiment illustrated in FIG. 8, for transferring restoration context data from a first NFS toward a second NFS.

FIG. 17 shows a basic component structure of an NRF node in accordance with another embodiment.

FIG. 18 shows a basic component structure of an NF service producer node in accordance with another embodiment.

FIG. 19 shows a basic component structure of an NF service consumer node in accordance with another embodiment.

DETAILED DESCRIPTION

The following describes currently preferred embodiments of apparatuses and methods for transferring restoration context data from a first NFS toward a second NFS. More particularly, the following also describes an NRF node, an NF service producer node, an NF service consumer node and respective methods executed therein.

FIG. 6 illustrates a method for transferring restoration context data from a first NFS toward a second NFS.

As FIG. 6 illustrates, a context transfer requester 40 transmits toward the first NFS 70a, during step S-600, a transfer request indicating transfer of context data from the first NFS to the second NFS 70b.

The first NFS 70a transmits toward an NRF 60, during step S-605, a context transfer request indicating transfer of context data from the first NFS to the second NFS, and the NRF 60 transmits toward the first NFS, during step S-610, a context transfer response indicating a status of the first NFS.

Then, the NRF 60 notifies an NF service consumer 50, during step S-615, of transfer information related to the transfer of context data from the first NFS to the second NFS.

Once the first NFS has received the context transfer response from the NRF, the first NFS 70a, may transfer the restoration context data toward the second NFS 70b. To this end, a first context transfer unit 726 of the first NFS 70a may retrieve from a first storage resource 728 of the first NFS 70a, during step S-620, the restoration context data, and the first context transfer unit may transfer toward a second context transfer unit 726 of the second NFS 70b, during step S-625, the restoration context data.

As FIG. 6 illustrates, the second NFS 70b stores, during step S-630, the restoration context data. For example, by updating the restoration context data, from the second context transfer unit 726 toward a second storage resource 728 of the second NFS 70b.

FIG. 6 also shows optional actions. For example, if not done at an earlier stage, the second NFS 70b should register for the transferred context in the NRF. To this end, the second NFS 70b may register toward the NRF 60, during step S-635, the second NFS, and the NRF 60 may notify the NF service consumer 50, during step S-640, of the second NFS registration.

Another optional action, illustrated in FIG. 6, is the acknowledge for the transfer request triggering this procedure. To this end, the first NFS 70a may transmit toward the context transfer requester 40, during step S-655, a transfer response indicating completion of the requested transfer.

FIG. 7 illustrates particular embodiments of the method illustrated in FIG. 6 for transferring restoration context data from a first NFS toward a second NFS.

As FIG. 7 illustrates, a context transfer requester 40 transmits toward the first NFS 70a, during step S-700, a transfer request indicating transfer of context data from the first NFS to the second NFS 70*b*.

The first NFS 70*a* transmits toward an NRF 60, during step S-705, a context transfer request indicating transfer of context data from the first NFS to the second NFS. In this embodiment, the context transfer request received at the NRF from the first NFS, during step S-705, corresponds to a deregistration request for the first NFS, the NRF deregisters the first NFS, and the NRF 60 transmits toward the first NFS, during step S-710, a context transfer response indicating that the first NFS is deregistered, as a status of the first NFS.

Then, the NRF 60 notifies an NF service consumer 50, during step S-715, of transfer information related to the transfer of context data from the first NFS to the second NFS. In this embodiment, this transfer information comprises a first indication indicating that the first NFS is deregistered and a second indication indicating transfer to the second NFS.

Once the first NFS has received the context transfer response from the NRF, the first NFS 70*a*, may transfer the restoration context data toward the second NFS 70*b*. To this end, a first context transfer unit 726 of the first NFS 70*a* may retrieve from a first storage resource 728 of the first NFS 70*a*, during step S-720, the restoration context data, and the first context transfer unit may transfer toward a second context transfer unit 726 of the second NFS 70*b*, during step S-725, the restoration context data.

As FIG. 7 illustrates, the second NFS 70*b* stores, during step S-730, the restoration context data. For example, by updating the restoration context data, from the second context transfer unit 726 toward a second storage resource 728 of the second NFS 70*b*.

FIG. 7 also shows similar optional actions as FIG. 6. For example, if not done at an earlier stage, the second NFS 70*b* should register for the transferred context in the NRF. To this end, the second NFS 70*b* may register toward the NRF 60, during step S-735, the second NFS, and the NRF 60 may notify the NF service consumer 50, during step S-740, of the second NFS registration.

Another optional action, illustrated in FIG. 7, is the acknowledge for the transfer request triggering this procedure. To this end, the first NFS 70*a* may transmit toward the context transfer requester 40, during step S-755, a transfer response indicating completion of the requested transfer.

FIG. 8 illustrates other particular embodiments of the method illustrated in FIG. 6 for transferring restoration context data from a first NFS toward a second NFS.

As FIG. 8 illustrates, a context transfer requester 40 transmits toward the first NFS 70*a*, during step S-800, a transfer request indicating transfer of context data from the first NFS to the second NFS 70*b*.

The first NFS 70*a* transmits toward an NRF 60, during step S-805, a context transfer request indicating transfer of context data from the first NFS to the second NFS. In this embodiment, the context transfer request received at the NRF from the first NFS, during step S-805, comprises a request to mark the transfer of context data from the first NFS as being ongoing, the NRF marks the transfer of context data from the first NFS as being ongoing, and the NRF 60 transmits toward the first NFS, during step S-810, a context transfer response indicating that the transfer of context data from the first NFS is ongoing, as a status of the first NFS.

Then, the NRF 60 notifies an NF service consumer 50, during step S-815, of transfer information related to the transfer of context data from the first NFS to the second NFS. In this embodiment, this transfer information comprises a first indication indicating that the transfer of context data from the first NFS is ongoing and a second indication indicating transfer to the second NFS.

Once the first NFS has received the context transfer response from the NRF, the first NFS 70*a*, may transfer the restoration context data toward the second NFS 70*b*. To this end, a first context transfer unit 726 of the first NFS 70*a* may retrieve from a first storage resource 728 of the first NFS 70*a*, during step S-820, the restoration context data, and the first context transfer unit may transfer toward a second context transfer unit 726 of the second NFS 70*b*, during step S-825, the restoration context data.

As FIG. 8 illustrates, the second NFS 70*b* stores, during step S-830, the restoration context data. For example, by updating the restoration context data, from the second context transfer unit 726 toward a second storage resource 728 of the second NFS 70*b*.

FIG. 8 also shows similar optional actions as FIG. 6. For example, if not done at an earlier stage, the second NFS 70*b* should register for the transferred context in the NRF. To this end, the second NFS 70*b* may register toward the NRF 60, during step S-835, the second NFS, and the NRF 60 may notify the NF service consumer 50, during step S-840, of the second NFS registration.

In this embodiment illustrated in FIG. 8 there are some alternatives. For example, upon receiving the registration of the second NFS 70*b*, the NRF 60 may trigger the deregistration of the first NFS 70*a*. Alternatively, the first NFS 70*a* may transmit toward the NRF 60, during step S-845, a deregistration request to deregister the first NFS. Irrespective of the alternative, the NRF 60 may also notify toward the NF service consumer 50, during step S-850, of deregistration of the first NFS.

Another optional action, illustrated in FIG. 8, is the acknowledge for the transfer request triggering this procedure. To this end, the first NFS 70*a* may transmit toward the context transfer requester 40, during step S-855, a transfer response indicating completion of the requested transfer.

This procedure illustrated in FIG. 8 may further include some actions not illustrated but further discussed in more detailed embodiments. For example, the first NFS may transmit toward the second NFS an activation request indicating that the transfer of context data from the first NFS is completed, the second NFS may transmit toward the NRF a request to reset the mark of the transfer of context data being ongoing, and the NRF may reset the mark of the transfer of context data.

The embodiment discussed above with reference to FIG. 7 is further detailed. A new service Nnf_ContextTransfer is proposed to be defined in any NF that is required to transfer Restoration context. In case of applicability to Service instances or Service Sets, the operations indicated will be added to operations defined for this service. The Nnf_ContextTransfer service implements following operation Order (optional), Prepare, Send and Activate. This proposal considers the destination Set of the context transfer is provided in the request to trigger the context transfer, that is, it is known by the requester of the transfer, e.g. O&M.

General considerations for the embodiment discussed above with reference to FIG. 7:

i) Generic procedure valid for all the NFs: Further actions may be required after the context is transferred (e.g. potential UE interaction, UDM registration, etc. or other related business logic actions). This is not considered part of the generic procedure since it depends a lot on each NF logic. This should be considered ad-hoc, for each NF.
ii) Enough context data is transferred to allow the receiver to restore internal business logic, i.e. Restoration Context: Context transfer could be done by subsets or chunks, but the procedure is not considered finished until Restoration context is transferred.
iii) Method to ensure consistency of data under restoration: Until the required context is not fully transferred, the swap is not activated in the consumer. While the required context is being transferred the context is not accessible for operations in the source Set.
iv) In each NF (or as an extension of each Service) it is proposed to define a new service Nnf_ContextTransfer, with following operations:
  a. Order (optional):
    From ContextTransfer requestor (O&M or an NF for specific events) to the (sender) NF.
    It requests to start a context transfer from an NF Set to another. This operation may be used not only for Restoration Context transfer but be defined as an "Order" for context transfer, with an input parameter that indicates the expected context to be transferred. For this invention, the input parameter will indicate "Restoration Context". The response to the Order request informs about the result, potentially listing the content that could not be transferred.
    O&M may not use the service but other proprietary means. This is why this operation may be considered as optional.
    Before the Restoration context transfer starts, the sender NF Set is deregistered from the NRF. The deregistration information also includes the receiver NF (Set2).
  b. Prepare
    From Set1 ContextTransfer service to Set2 ContexTransfer service.
    It needs to identify whether the Set2 (receiver) is able to cope with Restoration context transfer.
    This operation may be used not only for Restoration Context transfer preparation but be defined as a "Prepare" for context transfer, with an input parameter that indicates the expected context to be transferred. For this specification, the input parameter will indicate "Restoration Context".
  c. Send
    From Set1 ContextTransfer service to Set2 ContexTransfer service.
    It conveys the Context.
    This operation may be used not only for Restoration Context transfer conveyance but be defined as an "Send" for context transfer, with an input parameter that indicates the expected context to be transferred. For this invention, the input parameter may indicate "Restoration Context", or any other identification of subsets/chunks of that context (when multiple Send operations are required to transfer Restoration Context).
  d. Activate (Conditional)
    From Set1 ContextTransfer service to Set2 ContexTransfer service.
    It indicates that new transferred context shall be activated (set to be in use). This requires registering Set2 in the NRF, in case it has not been previously registered to the NRF.
    The response message includes the activation result and potentially information about the activation errors (i.e., context that could not be reactivated at the receiver).

This embodiment provides the following advantages:
It supports operators' requirements to deploy multiple Sets (for the same service type) by different vendors.
It provides context transfer to an alternative Set2 (for the same NF type) in case Set1 is set to unavailable by controlled means (e.g. planned SW upgrade) or it is identified internally by certain events (e.g. NF Set 1 is reaching load maximum threshold). By this, it allows e.g. a vendorX NFtype1 is upgraded while other vendorY keeps providing NF services; may simplify break-ins
Transferred new context is only made accessible when the transfer has already been completed, ensuring full consistency. That is, context is not accessible if partly transferred, what could cause application logic errors.
The consumer of the NF Set transferring context is informed about the new destination. This allows an easy swap by all affected consumers.
Restoration context transfer avoids context inconsistencies. It is uncertain to which extend the (producer) context data used to execute a consumer requested operation is related to whole context data stored by other producers in the same NF. Then, when the Set context data is requested to be transferred, it has to be done all at once in order to ensure data context consistency.
restoration context transfer avoids keeping track in the consumers of where which part of the context is stored. This may increase a lot complexity in the consumer logic apart from requiring caching this information, considering contexts are per UE and/or PDU sessions, this may be a huge amount of data.

Still with reference to the embodiment illustrated in FIG. 7, the flowchart in FIG. 12 illustrates at least some actions carried out, in accordance with this embodiment, for transferring restoration context, and just discussed above. As illustrated in FIG. 12, there may be six actions to be carried out in a suitable order: 1) Trigger for restoration context transfer (destination entity); 2) Ensure the context is no longer changed; 3) Inform potential consumers of new producer (i.e. destination entity); 4) Access restoration context and transfer to destination; 5) Activate context at destination (and Information to consumer of the new destination); and 6) Notify about completion of restoration context transfer.

Moreover, actions 1 to 8 illustrated if FIG. 14 correspond to a legacy sequence of actions carried out for accessing an NF instance in a set, and it is assumed as a starting point for a detailed and exemplary description of the embodiments illustrated in FIG. 7 and FIG. 8. These actions 1 to 8 in FIG. 14 are disclosed in the following.

Action 1. Service B (as a consumer in NF-Y) 50, needs to discover Service A (as a producer in NF-X). Either service B provides some selection criteria in the discovery request, or it performs a selection on the discovery results, based on that an address is selected to contact Service A.

Action 2. Service B may subscribe to the NRF 60, for example with Nnrf_NFManagement_NFSubscribe (NF-X profile updates & Deregistration), in order to receive information of the update of the NF-X status, in particular in this use case, Service B is interested in the destination NF-X Set that is updated as part of the Registration or with an NFUpdate. This is a new attribute to be included into the NF-X instance profile.

Action 3. Service B (a consumer of service A) 50 requests a Service A operation, that is sent to an address obtained from the discovery and selection in Action 1. This address in the figure identifies a Single Point of Access (SPoA) but as an alternative it could be the address of one instance of Service.

Action 4. Any instance of Set 1 is potentially reachable, one instance in the Set may be selected based on different criteria (e.g. load). One instance in Set 1 is attempted to be selected and the request is forwarded to this one.

Action 5. (Optional). Context data may be read from the storage resource of this Set, this is the unique place where this context is stored and up to date. Note that the storage resource is shown as being part of the NF set. This is rather a logical relation showing that only the NF instances of a given Set may reach it. however, the Storage resource can be a separate entity, e.g. an Unstructured Data Storage Function (UDSF).

Action 6. (Optional). After the instance executes its business logic if the context is modified, it has to be updated in the storage resource.

Actions 7-8. Successful response.

Further to the starting point illustrated in FIG. 14 and discussed above, the FIG. 15*a*, FIG. 15*b* and FIG. 15*c* provide additional details and sub-embodiments of the embodiment illustrated in FIG. 7 and are described in the following.

Action 9. A context transfer requester 40 could be O&M, or any NF could act as a requester based on certain events, e.g. Set1 is reaching a load maximum threshold. The proposal in the diagram is that any NF that is subject to transfer context implements a new SBA service, named e.g. Nnf_ContextTransfer, with an operation Order (input: destination Set). This Order operation will be responsible to receive the trigger to transfer Restoration context and start the actions to achieve so (explain below). Note that if the requester is the O&M, then the trigger may also be issued directly through the O&M interface. Also note that the context transfer requester may be the would-be receiver of the context, i.e. an instance from NF-X Instance Set 2.

Action 10. Set 1 is deregistered in the NRF by means of existing operation Nnrf_NFManagement_NFDeregister request. It is proposed to provide information as well at Deregistration, with a new attribute Restoration destination, that in this case will be set to the value "Set2". An alternative option will be using a regular Nnrf_NFManagement_NF-Deregister operation, and then make use of Nnrf_NFManagement_NFUpdate to update NF profile with this new information.

Action 11. Successful response.

Action 12. Since in step 2, Service B 50 subscribed to changes in NF-X profile and Deregistration, now it will be informed that Set1 has deregistered (then it should not be used any longer). The destination of the Restoration context transfer is Set2, this indicates which NF should be contacted to reach the restored context. That is, during the context transfer, until the context is reactivated in Set 2 (after Action 23) the context cannot be reached at the original destination (Set1). In such cases, the consumers may try to reach Set2, if required context is not yet available (because required context is not yet transferred as part of the Restoration context, and/or the context required is not yet re-build from the transferred context), consumer B 50 will get a failure. In this case, the consumer may set a timer after which it may re-try. The consumer is informed as well of the destination for Restoration context. This is very important in order to be able to swap from Set1 to Set2 when required (see Action 29).

Action 13. Nnf_ContextTransfer service accesses the Restoration context. This is implementation specific and today is not subject to 3GPP standardization. Context could be accessed in subsets, like access key ranges.

Action 14. Restoration context to be transferred if not identical with the context available in the NF (in general it is just a subset of it) and will consist of standard attributes defined by 3GPP. The NF thus needs to map its internal proprietary context information to the standardized Restoration context to be transferred.

Action 15. A new operation for service Nnf_Context-Transfer is required: Prepare, that is responsible to contact the receiver to indicate that it has to request context from the sender, and as well carry on with any required preparations. The Prepare operation may contain information about the number of UE or session related contexts to be transferred, which may be useful for the receiver to check/prepare the resources need to cope with the increased load due to context transfer.

Action 16. Nnf_ContextTransfer Prepare response, indicating whether the Restoration context transfer is affordable by the chosen receiver.

Action 17. A new operation for service Nnf_Context-Transfer is required: Send (context), that is responsible to convey the context from Set1 to Set2. This operation should be defined to accept any context to be conveyed, from the context for a single access key (e.g. UE), or the Restoration context.

Action 18. Context Transfer identifies for the transferred context, the URI of the resources, that consists on {apiRoot}/{apiName}/{apiVersion}/{apiSpecificResourceUriPart} as described in 3GPP TS 29.501 v15.2.0. It is required to build the "aux_apiroot mapping table" with the following information: (Set1)apiroot to (Set2) aux_apiroot.

Where the (Set1) apiroot is the one that is originally used in Set1 while (Set2) aux_apiroot, is a temporary and auxiliary apiroot that is required to be assigned for each of the apiroots that are transferred. This aux_apiroot will be used by the consumer to build the URI to reach the (Set1) resource (see Action 32). The usage of the aux_apiroot is required for two reasons:

I) It is a way to identify consumer requests for resources originally created in Set1 after they have been transferred. It is important to identify these URI requests from a consumer, to be able to apply the "Resource mapping table" that identifies the new assigned resource in Set2. If an aux_apiroot is not assigned, and the "regular" Set2 apiroots are used, then it will not be possible to distinguish when a consumer URI requests a resource originally created in Set1 or a resource created in Set2. This is important to be identified, because the "Resource mapping table" should only be applied for (Set1) resources.

II) The resource Id is locally assigned for each apiroot, this means that same resource Id may be assigned for multiple apiroots, then we need to keep a unique identification for each (Set1) resource when it is requested by the consumer after the context transfer, then we need as many (Set2) aux_apiroots as original (Set1) apiroots. On the contrary, overlapping resources will not be possible to be identified.

Note that other methods for identification and usage of the aux_apiroots could exist.

Action 19. Context Transfer requests creation of a resource to the corresponding service (Service A in this example). Context Transfer may use same standard mechanism for resource creation as the ones used by a consumer (e.g. Service B) 50, or alternatively proprietary means could be used. The service A instance selected for the creation is selected by internal criteria (e.g. load), that is identified by a (Set2) apiroot.

Action 20. Received context is stored in the Storage Resource of Set2. This could be done by proprietary means.

Action 21. When resource creation is successfully performed, a (Set2) resource IdY is assigned. Context transfer needs to build a "Resource mapping table" as follows: (Set2) aux_apiroot+(Set1) resourceId X to (Set2) apiroot+(Set2) resource IdY. This mapping table will be used to identify the URI received from a consumer the first time it attempts to access a resource originally created in Set1, after it is transferred to Set2.

Action 22. Nnf_ContextTransfer Send response, indicating whether the context transfer was successful.

Actions 17 to 22 could be repeated as many times as necessary to be able to access and transfer all required contexts, i.e. whole Restoration context.

Action 23. Once the Restoration context transfer is considered finalized, Set2 needs to be activated as soon as possible, so the new consumer requests can be processed in Set2. The activation of Set 2 may imply three different tasks:
  a) (Conditional) (24-25a) the new Set2 is Registered in NRF, so it becomes eligible by consumers. This is only required if Set2 is newly added as an NF Set. If on the contrary, it was already registered in NRF, this task is not required. New information is provided at registration, that will update the NF profile. This information is the "aux_apiroot mapping table", i.e. (Set2) aux_apiroot mapping for each of the (Set1) apiroots. This information is required by the consumer to be able to build the new URI to reach transferred resources, see step 30.
  b) (24-25b) If the Set2 was already registered, it is required to update the NF profile, as commented for a), providing the aux_apiroot mapping table.
  c) (Conditional) (26) once the context is transferred to Set2, in some cases there may be the need to process the context to restore the state, e.g. restoring internal data from the minimum amount of data that was conveyed (to minimize standardization) or contact other NFs that needs derived updates. This process is not always required, it depends on the amount of data that will be finally standardized (i.e. Restoration context, as explained above), and on the specific business logic of each service.

Context Transfer service (in Set1) activates Set2 by executing a new operation Nnf_ContextTransfer Activate request in Set2.

Action 24a. Nnf_ContextTransfer Activate is received by Set 2 (by Context Transfer service) then executes Set2 registration in NRF by means of existing operations Nnrf_NFManagement_NFRegister.

Action 25a. (Conditional) Response from NRF.

Action 24b. (if the "aux_apiroot mapping table" is created as described in Action 18) If the Set2 was already registered, it is required to update the NF profile. This information is the "aux_apiroot mapping table", i.e. (Set2) aux_apiroot mapping for each of the (Set1) apiroots. This information is required by the consumer to be able to build the new URI to reach transferred resources, see step 30.

Action 25b. Response from NRF.

Action 26. (Conditional) Execution of activation actions, if required. See c) in Action 23. This Action could include only the trigger of required actions, or alternatively the complete execution.

Action 27. Activate response.

Action 28. Service B is informed that Set2 has registered (conditional, Action 24-25a) or that the NF profile has been updated with the "aux_apiroot mapping table". It may as well be informed that activation is triggered (or alternatively finalized). From this moment, Service B could start using Set2 as the restoration Set, as it was informed in Action 12. In case, activation was not terminated in Action 23, there may be a transient time in which the consumer 50 may receive an error when trying to execute the operation in Set2, in such a case the consumer may re-attempt.

Action 29. Successful response to the requester of the Context Transfer. We can as well consider an asynchronous response right after the request message (in Action 9) and then the requester could be notified when the transfer is finished.

Action 30. Service B needs to use the new information in the NF profile "aux_apiroot mapping table" to be able to use a (Set2) aux_apiroot for the former (Set1) apiroot. The URI to access a (Set1) resourceId-x will be built with (Set2) aux_apiroot+(Set1) resourceId-x.

Action 31. Aux_apiroot may be defined to reach a Context Transfer instance.

Action 32. Context Transfer makes use of the "Resource mapping table" to find the (Set2) apiroot+(Set2) resource, for the URI received.

Action 33. Using new build URI, the right resource is accessed, and the operation can be executed.

Action 34. Successful response, that includes as Location (information for the consumer of the URI to be used to access this resource) the direct URI to access (Set2) resource, without the need to access via the "Resource mapping table". This may need some clarifications in 3GPP.

In order to be able to support NF instance Set (potentially by different vendors), and be able to recover network service, it is required to move context data in a standard way. A new service Nnf_ContextTransfer is proposed to be defined in any NF that is required to transfer Restoration context. This new service implements following operations Start, Prepare, Send, Activate. This method provides the consumers the info about the new Set to be used, instead of former Set, allowing to swap.

The embodiment discussed above with reference to FIG. 8 is further detailed. This embodiment provides a mechanism to inform a consumer that the context of a producer (NF Set1) is being transferred. This is done by including a new status information, "ongoing context transfer", for the NF Set1 profile in the NRF.

This information allows the consumer identifies a transient state: NF Set1 is undertaking a context transfer, then this will eventually be finished in a swap, that is, a new Set2 will take over Set1. Once the context is transferred, Set1 will be deregistered.

This embodiment is advantageous because it allows a consumer of a producer, which is under taking a context transfer, can make decisions based on the information of when the context transfer is ongoing, such as:
  The time context data in an NF Set that is under taking a context transfer is not readable is reduced. NF Set1 is available only for READ operations on the stored context until the consumer is informed that Set1 is deregistered. Modification of contexts are not allowed, since the context is being transferred already, then modification may be lost.

Consumers, while context is being transferred, may decide to establish new sessions at another available NF Set or notify other NFs/services, UEs, AFs or other entities that relate to the concerned session.

New indication when context transfer is finished that enables consumers to identify when they can start using the destination of the context transfer to make context-related service operations.

Still with reference to the embodiment illustrated in FIG. 8, the flowchart in FIG. 13 illustrates at least some actions carried out, in accordance with this embodiment, for transferring restoration context, and discussed above. As illustrated in FIG. 13, there may be seven actions to be carried out in a suitable order: 1) Trigger for restoration context transfer (destination entity); 2) Inform potential consumers about ongoing context transfer; 3) Inform potential consumers of new producer (i.e. destination entity); 4) Access restoration context and transfer to destination; 5) Activate context at destination (and Information to consumer of the new destination); 6) Deregistration of (source) NF; and 7) Notify about completion of restoration context transfer.

Further to the starting point illustrated in FIG. 14 and discussed above, the FIG. 16a, FIG. 16b and FIG. 16c provide additional details and sub-embodiments of the embodiment illustrated in FIG. 8 and are described in the following.

Given the commonalities between the embodiment illustrated in FIG. 16a-16b-16c and the embodiment illustrated in FIG. 15a-15b-15c, only distinguishing actions are discussed in the following.

Actions 10, 11 and 12. Instead of sending a Deregistration, as in FIG. 15a-15b-15c, in this case the NF Set profile is updated by Nnrf_NFManagement_NUpdate, indicating that there is an ongoing context transfer. Destination is provided as well as in FIG. 15a-15b-15c, but in this case, it is provided as part of the updated profile. Two new attributes are required in the NF profile: NF-X Set1 indication of ongoing context transfer and destination Set. Then, consumer is informed of the ongoing context transfer, and with that, it is aware of the transient state.

As commented above, any request that does not imply a modification is allowed. In FIG. 15a-15b-15c, from this point on, the context is not accessible, until the context was finalized and available in Set2. This is the main advantage of this method, since it allows that data is still accessible to be displayed. This allows some services to work, like exposure.

Since the consumers are also aware of the context being transferred and the targeted destination as well, they can query the NRF to get information about this NF (locality, services, etc) and decide about the need for taking further actions, such as:

Setting up new sessions (context) for the affected UE/session, e.g., in the cases when it is expected that the context cannot be re-established (with the required characteristics at the destination).

Initiating notifications towards other SBA services and/or UEs and AFs that may in turn initiate other actions. For example, in high-availability use cases with dual UE and coupled disjoint user plane paths, if the active UE is impacted by the transfer, one can swap the active-backup UE/paths to avoid potential glitches while re-activating the active path.

Actions 29, 30 and 31. These actions are carried out to Deregister Set1 as illustrated in FIG. 16b. After all required context is transferred, then Set1 is not any longer available, not even for non-modification operations. This information is used by the consumer to identify it has now to start using Set2 (as informed in Action 12 shown in FIG. 16a).

This allows the consumer to have control over the moment Set2 is ready to accept requests, what ensures full consistency of data, as long as all required context data is already transferred and Set2 is able to restore former business logic processing state. Until this moment, if the consumer tries to use Set2, for some implementation is may get a response since default data may be available, then consumer may get incorrect data that will corrupt processing.

In order to carry out these methods discussed with reference to FIG. 6 to FIG. 8 as well as, at least partially, the embodiments illustrated in FIG. 14, FIG. 15a-15b-15c and FIG. 16a-16b-16c, different embodiments of the NRF node 60 are illustrated in FIG. 9 and FIG. 17.

In accordance with an embodiment illustrated in FIG. 9, the NRF node 60 is configured to assist in transferring restoration context data from a first NFS node 70a toward a second NFS node 70b and may comprise at least one processor 620, and at least one memory 610 that stores processor-executable instructions 614. In this NRF node, the at least one processor interfaces with the at least one memory to execute the processor-executable instructions, whereby the NRF node is operable to perform the actions disclosed in the following.

This NRF node 60 illustrated in FIG. 9 may be operable to receive, from the first NFS node 70a via a receiver 630, a context transfer request indicating transfer of context data from the first NFS 70a node to the second NFS 70b node; transmit, toward the first NFS node 70a via a transmitter 640, a context transfer response indicating a status of the first NFS; and notify, a NF service consumer node 50 via the transmitter 640, of transfer information related to the transfer of context data from the first NFS node to the second NFS node.

In some embodiments for this NRF node illustrated in FIG. 9, a service unit 627 running in the processor 620 may handle the logic related to the SBA services, such as the registration and discovery, and a protocol unit 624 running in the processor 620 may control the transmitter 640 and receiver 630 for transmission and reception of messages.

If required at all, the NRF node 60, illustrated in FIG. 9, may be complemented with a data section 618 in memory to store process related data such as status of a context data transfer.

The NRF node illustrated in FIG. 9 may thus comprise the at least one processor 620 and the at least one memory 610, both in communication with each other, with the protocol unit 624, the service unit 627, the receiver 630 and the transmitter 640, and with other elements or units of the NRF node. The at least one memory 610 may comprise volatile and/or non-volatile memory. In particular, the at least one memory 610 may have a computer program 614 and data 618 stored therein. The computer program 614 may be loaded in the at least one memory 610 from a computer program product 650, such as any non-transitory computer readable medium, in which the computer program is stored. The data 618 may comprise process related data such as status of a context data transfer and others. The at least one processor 620 may be configured to carry out the functions of the protocol unit 624 and the service unit 627.

In accordance with another embodiment illustrated in FIG. 17, the NRF node 60 comprises a receiver 630 and a transmitter 640, and may be operable to receive, from the first NFS node 70a via the receiver 630, a context transfer request indicating transfer of context data from the first NFS 70a node to the second NFS 70b node; transmit, toward the first NFS node 70a via the transmitter 640, a context transfer response indicating a status of the first NFS; and notify, a NF service consumer node 50 via the transmitter 640, of transfer information related to the transfer of context data from the first NFS node to the second NFS node.

This NRF node illustrated in FIG. 17 may also comprise a service unit 627 handling the logic related to the SBA services, such as the registration and discovery, and a protocol unit 624 controlling the transmitter 640 and receiver 630 for transmission and reception of messages.

In order to carry out these methods discussed with reference to FIG. 6 to FIG. 8 as well as, at least partially, the embodiments illustrated in FIG. 14, FIG. 15a-15b-15c and FIG. 16a-16b-16c, different embodiments of the NF service producer node 70a and 70b are illustrated in FIG. 10 and FIG. 18.

In accordance with an embodiment illustrated in FIG. 10, the NF service producer node 70a and 70b is configured to assist in transferring restoration context data from a first NFS node 70a toward a second NFS node 70b, and it may comprise at least one processor 720, and at least one memory 710 that stores processor-executable instructions 714. In this NF service producer node, the at least one processor interfaces with the at least one memory to execute the processor-executable instructions, whereby the NF service producer node is operable to perform the actions disclosed in the following.

This NF service producer node 70a and 70b illustrated in FIG. 10, when acting as a transferring NF service producer node 70a, may be operable to receive, from a context transfer requester 40 via a receiver 730, a transfer request indicating transfer of context data toward the second NFS node 70b; transmit, toward an NRF node 60 via a transmitter 740, a context transfer request indicating transfer of context data from the first NFS node to the second NFS node; receive, from the NRF node via the receiver 730, a context transfer response indicating a status of the first NFS; and transfer, from the first NFS node toward the second NFS node, restoration context data.

This NF service producer node 70a and 70b illustrated in FIG. 10, when acting as a transferred NF service producer node 70b, may be operable to receive, from the first NFS node 70a via a receiver 730, transferred restoration context data; and store, at a storage resource 728, the restoration context data.

In some embodiments for this NF service producer node 70a and 70b illustrated in FIG. 10, a service unit 724 running in the processor 720 may handle the logic related to the SBA services, such as the registration and discovery, a context transfer unit 726 running in the processor 720 may handle the transfer of context data and may control the transmitter 740 and receiver 730 for transmission and reception of messages, and a storage resource 728 running in the processor 720 may store the context data.

If required at all, the NF service producer node 70a and 70b, illustrated in FIG. 10, may be complemented with a data section 718 in memory to store process related data such as status of a context data transfer and others.

The NF service producer node 70a and 70b illustrated in FIG. 10 may thus comprise the at least one processor 720 and the at least one memory 710, both in communication with each other, with the service unit 724, the context transfer unit 726, the storage resource 728, the receiver 730 and the transmitter 740, and with other elements or units of the NF service producer node. The at least one memory 710 may comprise volatile and/or non-volatile memory. In particular, the at least one memory 710 may have a computer program 714 and data 718 stored therein. The computer program 714 may be loaded in the at least one memory 710 from a computer program product 750, such as any non-transitory computer readable medium, in which the computer program is stored. The data 718 may comprise process related data such as status of a context data transfer and others. The at least one processor 720 may be configured to carry out the functions of the service unit 724, the context transfer unit 726 and the storage resource 728.

In accordance with another embodiment illustrated in FIG. 18, the NF service producer node 70a and 70b is configured to assist in transferring restoration context data from a first NFS node 70a toward a second NFS node 70b, and it may comprise a receiver 730 and a transmitter 740.

This NF service producer node 70a and 70b illustrated in FIG. 18, when acting as a transferring NF service producer node 70a, may be operable to receive, from a context transfer requester 40 via a receiver 730, a transfer request indicating transfer of context data toward the second NFS node 70b; transmit, toward an NRF node 60 via a transmitter 740, a context transfer request indicating transfer of context data from the first NFS node to the second NFS node; receive, from the NRF node via the receiver 730, a context transfer response indicating a status of the first NFS; and transfer, from the first NFS node toward the second NFS node, restoration context data.

This NF service producer node 70a and 70b illustrated in FIG. 18, when acting as a transferred NF service producer node 70b, may be operable to receive, from the first NFS node via a receiver 730, transferred restoration context data; and store, at a storage resource 728, the restoration context data.

This NF service producer node 70a and 70b illustrated in FIG. 18 may also comprise a service unit 724 handling the logic related to the SBA services, such as the registration and discovery, a context transfer unit 726 handling the transfer of context data and controlling the transmitter 740 and receiver 730 for transmission and reception of messages, and a storage resource 728 storing the context data.

In order to carry out these methods discussed with reference to FIG. 6 to FIG. 8 as well as, at least partially, the embodiments illustrated in FIG. 14, FIG. 15a-15b-15c and FIG. 16a-16b-16c, different embodiments of the NF service consumer node 50 are illustrated in FIG. 11 and FIG. 19.

In accordance with an embodiment illustrated in FIG. 11, the NF service consumer node 50 is configured to assist in transferring restoration context data from a first NFS node 70a toward a second NFS node 70b, and it may comprise at least one processor 520, and at least one memory 510 that stores processor-executable instructions 514. In this NF service consumer node, the at least one processor interfaces with the at least one memory to execute the processor-executable instructions, whereby the NF service consumer node is operable to perform the actions disclosed in the following.

This NF service consumer node 50 illustrated in FIG. 11 may be operable to receive, from an NRF node 60, a notification of transfer information related to the transfer of context data from the first NFS node to the second NFS node.

In some embodiments for this NF service consumer node 50 illustrated in FIG. 11, a service unit 526 running in the processor 520 may handle the logic related to the SBA services, such as the registration and discovery.

If required at all, the NF service consumer node 50, illustrated in FIG. 11, may be complemented with a data section 518 in memory to store process related data such as status of a context data transfer and others.

The NF service consumer node 50 illustrated in FIG. 11 may thus comprise the at least one processor 520 and the at least one memory 510, both in communication with each other, with the service unit 526, the receiver 530 and the transmitter 540, and with other elements or units of the NF service consumer node. The at least one memory 510 may comprise volatile and/or non-volatile memory. In particular, the at least one memory 510 may have a computer program 514 and data 518 stored therein. The computer program 514 may be loaded in the at least one memory 510 from a computer program product 550, such as any non-transitory computer readable medium, in which the computer program is stored. The data 518 may comprise process related data such as status of a context data transfer and others. The at least one processor 520 may be configured to carry out the functions of the service unit 526.

In accordance with another embodiment illustrated in FIG. 19, the NF service consumer node 50 is configured to assist in transferring restoration context data from a first NFS node 70*a* toward a second NFS node 70*b*, and it may comprise a receiver 530 and a transmitter 540.

This NF service consumer node 50 illustrated in FIG. 19 may be operable to receive, from an NRF node 60, a notification of transfer information related to the transfer of context data from the first NFS node to the second NFS node.

This NF service consumer node 50 illustrated in FIG. 19 may also comprise a service unit 526 handling the logic related to the SBA services, such as the registration and discovery.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

As used herein, the word "comprising" does not exclude the presence of other elements or steps than those listed and the words "a" or "an" preceding an element do not exclude the presence of a plurality of such elements. Further, any reference signs do not limit the scope of the claims, the invention may be at least in part implemented by means of both hardware and software, and several "means" or "units" may be represented by the same item of hardware.

In the following, exemplary numbered embodiments are listed.

1. A method for transferring restoration context data from a first network functional set, NFS, toward a second NFS, the method comprising:
    receiving (S-600), at the first NFS (70*a*) from a context transfer requester (40), a transfer request indicating transfer of context data toward the second NFS (70*b*);
    transmitting (S-605, S-705, S-805), from the first NFS toward a network repository function, NRF, (60) a context transfer request indicating transfer of context data from the first NFS to the second NFS;
    transmitting (S-610, S-710, S-810), from the NRF toward the first NFS, a context transfer response indicating a status of the first NFS;
    notifying (S-615, S-715, S-815), from the NRF toward a network function, NF, service consumer (50), of transfer information related to the transfer of context data from the first NFS to the second NFS;
    transferring (S-620, S-625), from the first NFS toward the second NFS, restoration context data; and
    storing (S-630), at the second NFS, the restoration context data.

2. The method of embodiment 1, wherein transferring the restoration context data, from the first NFS toward the second NFS, comprises retrieving (S-620), at a first context transfer module of the first NFS from a first storage resource of the first NFS, the restoration context data, and transferring (S-625), from the first context transfer module toward a second context transfer module of the second NFS, the restoration context data.

3. The method of embodiment 2, wherein storing (S-630), at the second NFS, the restoration context data, comprises updating (S-630) the restoration context data, from the second context transfer module toward a second storage resource of the second NFS.

4. The method of any one of embodiments 1 to 3, wherein both first NFS and second NFS correspond to any one of: a network function, NF, instance; an NF set comprising one or more NF instances; a service instance; and a service set comprising one or more service instances.

5. The method of any one of embodiments 1 to 4, wherein the restoration context data comprises any one of: user equipment, UE, related data and protocol data unit, PDU, session related data.

6. The method of any one of embodiments 1 to 5, wherein the context transfer response, transmitted (S-710) from the NRF toward the first NFS, indicates that the first NFS is deregistered.

7. The method of embodiment 6, wherein the transfer information related to the transfer of context data, notified (S-715) from the NRF toward the NF service consumer (50), comprises a first indication indicating that the first NFS is deregistered and a second indication indicating transfer to the second NFS.

8. The method of any one of embodiments 6 or 7, wherein the context transfer request, received (S-705) at the NRF from the first NFS, corresponds to a deregistration request for the first NFS.

9. The method of any one of embodiments 1 to 5, wherein the context transfer response, transmitted (S-810) from the NRF toward the first NFS, indicates that the transfer of context data from the first NFS is ongoing.

10. The method of embodiment 9, wherein the transfer information related to the transfer of context data, notified (S-815) from the NRF toward the NF service consumer (50), comprises a first indication indicating that the transfer of context data from the first NFS is ongoing and a second indication indicating transfer to the second NFS.

11. The method of any one of embodiments 9 or 10, wherein the context transfer request, received (S-805)

at the NRF from the first NFS, comprises a request to mark the transfer of context data from the first NFS as being ongoing.

12. The method of embodiment 11, wherein the method further comprises:
transmitting, from the first NFS toward the second NFS, an activation request indicating that the transfer of context data from the first NFS is completed; and
transmitting, from the second NFS toward the NRF, a request to reset the mark of the transfer of context data being ongoing.

13. The method of any one of embodiments 9 to 12, wherein the method further comprises:
transmitting (S-845), from the first NFS toward the NRF, a deregistration request to deregister the first NFS; and
notifying (S-850), from the NRF toward the NF service consumer (50), of deregistration of the first NFS.

14. The method of any one of embodiments 1 to 13, wherein the method further comprises:
registering (S-635, S-735, S-835), from the second NFS toward the NRF, the second NFS;
notifying (S-640, S-740, S-840) the NF service consumer (50), from the NRF (60), of the second NFS registration.

15. The method of any one of embodiments 1 to 14, wherein the method further comprises transmitting (S-655, S-755, S-855), from the first NFS (70*a*) toward the context transfer requester (40), a transfer response indicating completion of the requested transfer.

16. A method for assisting a transfer of restoration context data from a first network functional set, NFS, (70*a*) toward a second NFS (70*b*), the method carried out at a network repository function, NRF, (60) and comprising:
receiving (S-605, S-705, S-805), from the first NFS, a context transfer request indicating transfer of context data from the first NFS to the second NFS;
transmitting (S-610, S-710, S-810), toward the first NFS, a context transfer response indicating a status of the first NFS; and
notifying (S-615, S-715, S-815), a network function, NF, service consumer (50), of transfer information related to the transfer of context data from the first NFS to the second NFS.

17. The method of embodiment 16, wherein the context transfer response, transmitted (S-710) from the NRF toward the first NFS, indicates that the first NFS is deregistered.

18. The method of embodiment 17, wherein the transfer information related to the transfer of context data, notified (S-715) from the NRF toward the NF service consumer (50), comprises a first indication indicating that the first NFS is deregistered and a second indication indicating transfer to the second NFS.

19. The method of any one of embodiments 17 or 18, wherein the context transfer request, received (S-705) at the NRF from the first NFS, corresponds to a deregistration request for the first NFS.

20. The method of embodiment 16, wherein the context transfer response, transmitted (S-810) from the NRF toward the first NFS, indicates that the transfer of context data from the first NFS is ongoing.

21. The method of embodiment 20, wherein the transfer information related to the transfer of context data, notified (S-815) from the NRF toward the NF service consumer (50), comprises a first indication indicating that the transfer of context data from the first NFS is ongoing and a second indication indicating transfer to the second NFS.

22. The method of any one of embodiments 20 or 21, wherein the context transfer request, received (S-805) at the NRF from the first NFS, comprises a request to mark the transfer of context data from the first NFS as being ongoing.

23. The method of embodiment 22, wherein the method further comprises:
receiving, from the second NFS, a request to reset the mark of the transfer of context data being ongoing; and
resetting the mark of the transfer of context data being ongoing.

24. The method of any one of embodiments 20 to 23, wherein the method further comprises:
receiving (S-845), from the first NFS, a deregistration request to deregister the first NFS; and
notifying (S-850), the NF service consumer (50), of deregistration of the first NFS.

25. The method of any one of embodiments 16 to 24, wherein the method further comprises:
receiving (S-635, S-735, S-835), from the second NFS, a registration request to register the second NFS;
notifying (S-640, S-740, S-840), the NF service consumer (50), of the second NFS registration.

26. A method for assisting a transfer of restoration context data from a first network functional set, NFS, (70*a*) toward a second NFS (70*b*), the method carried out at the first NFS (70*a*) and comprising:
receiving (S-600), from a context transfer requester (40), a transfer request indicating transfer of context data toward the second NFS (70*b*);
transmitting (S-605, S-705, S-805), toward a network repository function, NRF, (60) a context transfer request indicating transfer of context data from the first NFS to the second NFS;
receiving (S-610, S-710, S-810), from the NRF, a context transfer response indicating a status of the first NFS;
transferring (S-620, S-625), from the first NFS toward the second NFS, restoration context data.

27. The method of embodiment 26, wherein transferring the restoration context data, from the first NFS toward the second NFS, comprises retrieving (S-620), at a first context transfer module of the first NFS from a first storage resource of the first NFS, the restoration context data, and transferring (S-625), from the first context transfer module toward a second context transfer module of the second NFS, the restoration context data.

28. The method of any one of embodiments 26 or 27, wherein the context transfer response, received (S-710) from the NRF, indicates that the first NFS is deregistered.

29. The method of any one of embodiments 26 to 28, wherein the context transfer request, transmitted (S-705) toward the NRF, corresponds to a deregistration request for the first NFS.

30. The method of any one of embodiments 26 or 27, wherein the context transfer response, received (S-810) from the NRF, indicates that the transfer of context data from the first NFS is ongoing.

31. The method of any one of embodiments 26 to 30, wherein the context transfer request, transmitted (S-805) toward the NRF, comprises a request to mark the transfer of context data from the first NFS as being ongoing.

32. The method of embodiment 31, wherein the method further comprises transmitting, from the first NFS toward the second NFS, an activation request indicating that the transfer of context data from the first NFS is completed.

33. The method of any one of embodiments 30 to 32, wherein the method further comprises transmitting (S-845), from the first NFS toward the NRF, a deregistration request to deregister the first NF S.

34. The method of any one of embodiments 26 to 33, wherein the method further comprises transmitting (S-655, S-755, S-855), from the first NFS (70a) toward the context transfer requester (40), a transfer response indicating completion of the requested transfer.

35. A method for assisting a transfer of restoration context data from a first network functional set, NFS, (70a) toward a second NFS (70b), the method carried out at the second NFS (70b) and comprising:
receiving (S-625), from the first NFS, transferred restoration context data; and
storing (S-630), at the second NFS, the restoration context data.

36. The method of embodiment 35, wherein receiving the transferred restoration context data, from the first NFS, comprises receiving (S-625), at a second context transfer module of the second NFS from a first context transfer module of the first NFS, the transferred restoration context data.

37. The method of embodiment 36, wherein storing (S-630) the restoration context data comprises updating (S-630) the restoration context data, from the second context transfer module toward a second storage resource of the second NFS.

38. The method of any one of embodiments 35 to 37, wherein the method further comprises:
receiving, from the first NFS, an activation request indicating that the transfer of context data from the first NFS is completed; and
transmitting, toward the NRF, a request to reset the mark of the transfer of context data being ongoing.

39. The method of any one of embodiments 35 to 38, wherein the method further comprises transmitting (S-635, S-735, S-835), toward the NRF, a registration request to register the second NFS.

40. A method for assisting a transfer of restoration context data from a first network functional set, NFS, (70a) toward a second NFS (70b), the method carried out at a network function, NF, service consumer (50) and comprising:
receiving (S-615, S-715, S-815), from a network repository function, NRF, (60), a notification of transfer information related to the transfer of context data from the first NFS to the second NFS.

41. The method of embodiment 40, wherein the transfer information related to the transfer of context data, notified (S-715) from the NRF, comprises a first indication indicating that the first NFS is deregistered and a second indication indicating transfer to the second NFS.

42. The method of embodiment 40, wherein the transfer information related to the transfer of context data, notified (S-815) from the NRF, comprises a first indication indicating that the transfer of context data from the first NFS is ongoing and a second indication indicating transfer to the second NFS.

43. The method of embodiment 42, wherein the method further comprises receiving (S-850), from the NRF, a notification of deregistration of the first NFS.

44. The method of any one of embodiments 40 to 43, wherein the method further comprises receiving (S-640, S-740, S-840), from the NRF, a notification of the second NFS registration.

45. A network repository function, NRF, node (60) configured to assist in transferring restoration context data from a first network functional set, NFS, node (70a) toward a second NFS node (70b), wherein the NRF node (60) further is configured to:
receive, from the first NFS node (70a) via a receiver (630), a context transfer request indicating transfer of context data from the first NFS (70a) node to the second NFS (70b) node;
transmit, toward the first NFS node (70a) via a transmitter (640), a context transfer response indicating a status of the first NFS; and
notify, a network function, NF, service consumer node (50) via the transmitter (640), of transfer information related to the transfer of context data from the first NFS node to the second NFS node.

46. The NRF node (60) of embodiment 45, further configured to perform the method of any one of embodiments 16 to 25.

47. A first network functional set, NFS, node (70a) configured to assist in transferring restoration context data from the first NFS node (70a) toward a second NFS node (70b), wherein the first NFS node (70a) further is configured to:
receive, from a context transfer requester (40) via a receiver (730), a transfer request indicating transfer of context data toward the second NFS node (70b);
transmit, toward a network repository function, NRF, node (60) via a transmitter (740), a context transfer request indicating transfer of context data from the first NFS node to the second NFS node;
receive, from the NRF node via the receiver (730), a context transfer response indicating a status of the first NFS;
transfer, from the first NFS node toward the second NFS node, restoration context data.

48. The first NFS node (70a) of embodiment 47, further configured to perform the method of any one of embodiments 26 to 34.

49. A second network functional set, NFS, node (70b) configured to assist in transferring restoration context data from a first NFS node (70a) toward the second NFS node (70b), wherein the second NFS node (70b) further is configured to:
receive, from the first NFS node via a receiver (730), transferred restoration context data; and
store, at a storage resource (728), the restoration context data.

50. The second NFS node (70b) of embodiment 49, further comprising a transmitter (740) and configured to perform the method of any one of embodiments 35 to 39.

51. A network function, NF, service consumer node (50) configured to assist in transferring restoration context data from a first NFS node (70a) toward a second NFS node (70b), wherein the NF service consumer node (50) further is configured to:

receive, from a network repository function, NRF, node (60), a notification of transfer information related to the transfer of context data from the first NFS node to the second NFS node.

52. The NF service consumer (50) of embodiment 51, further configured to perform the method of any one of embodiments 40 to 44.

The invention claimed is:

1. A network repository function, NRF, node configured to assist in transferring restoration context data from a first network functional set, NFS, node toward a second NFS node by being configured to:
   receive, from the first NFS node via a receiver, a context transfer request indicating transfer of context data from the first NFS node to the second NFS node;
   transmit, toward the first NFS node via a transmitter, a context transfer response, the context transfer response indicating a status of the first NFS node and indicating that the transfer of context data from the first NFS node is ongoing; and
   notify, a network function, NF, service consumer node via the transmitter, of transfer information related to the transfer of context data from the first NFS node to the second NFS node.

2. The NRF node of claim 1, wherein the transfer information related to the transfer of context data, notified from the NRF toward the NF service consumer, comprises a first indication indicating that the transfer of context data from the first NFS is ongoing and a second indication indicating transfer to the second NFS.

3. The NRF node of claim 1, wherein the context transfer request, received at the NRF from the first NFS, comprises a request to mark the transfer of context data from the first NFS as being ongoing.

4. The NRF node of claim 3, wherein the NRF node is further configured to:
   receive, from the second NFS, a request to reset the mark of the transfer of context data being ongoing; and
   reset the mark of the transfer of context data being ongoing.

5. The NRF node of claim 1, wherein the NRF node is further configured to:
   receive, from the first NFS, a deregistration request to deregister the first NFS; and
   notify, the NF service consumer, of deregistration of the first NFS.

6. The NRF node of claim 1, wherein the NRF node is further configured to:
   receive, from the second NFS, a registration request to register the second NFS;
   notify, the NF service consumer, of the second NFS registration.

7. A first network functional set, NFS, node configured to assist in transferring restoration context data from the first NFS node toward a second NFS node by being configured to:
   receive, from a context transfer requester via a receiver, a transfer request indicating transfer of context data toward the second NFS node;
   transmit, toward a network repository function, NRF, node via a transmitter, a context transfer request indicating transfer of context data from the first NFS node to the second NFS node;
   receive, from the NRF node via the receiver, a context transfer response, the context transfer response indicating a status of the first NFS node and indicating that the transfer of context data from the first NFS node is ongoing; and
   transfer, from the first NFS node toward the second NFS node, restoration context data.

8. The first NFS node of claim 7, wherein transferring the restoration context data, from the first NFS toward the second NFS, comprises retrieving, at a first context transfer module of the first NFS from a first storage resource of the first NFS, the restoration context data, and transferring, from the first context transfer module toward a second context transfer module of the second NFS, the restoration context data.

9. The first NFS node of claim 7, wherein the context transfer request, transmitted toward the NRF, comprises a request to mark the transfer of context data from the first NFS as being ongoing.

10. The first NFS node of claim 9, wherein the first NFS node is further configured to transmit, from the first NFS toward the second NFS, an activation request indicating that the transfer of context data from the first NFS is completed.

11. The first NFS node of claim 7, wherein the first NFS node is further configured to transmit, from the first NFS toward the NRF, a deregistration request to deregister the first NFS.

12. The first NFS node of claim 7, wherein the first NFS node is further configured to transmit, from the first NFS toward the context transfer requester, a transfer response indicating completion of the requested transfer.

* * * * *